(12) United States Patent
Li et al.

(10) Patent No.: US 11,181,608 B2
(45) Date of Patent: *Nov. 23, 2021

(54) MORE ACCURATE ASSET TAG LOCATING OF RADIO FREQUENCY DEVICES

(71) Applicant: ABL IP HOLDING LLC, Conyers, GA (US)

(72) Inventors: Xiangrong Li, Brookline, MA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,288

(22) Filed: Aug. 8, 2019

(65) Prior Publication Data

US 2019/0361089 A1 Nov. 28, 2019

Related U.S. Application Data

(63) Continuation of application No. 15/916,893, filed on Mar. 9, 2018, now Pat. No. 10,422,848.

(51) Int. Cl.
*H04W 24/00* (2009.01)
*G01S 5/02* (2010.01)
(Continued)

(52) U.S. Cl.
CPC .......... *G01S 5/0236* (2013.01); *G01S 5/0226* (2013.01); *G01S 5/08* (2013.01); *H04B 17/318* (2015.01)

(58) Field of Classification Search
CPC . G01S 5/02; G01S 5/08; G01S 5/0036; G01S 5/0236; G01S 11/06; G01S 5/0226;
(Continued)

(56) References Cited

U.S. PATENT DOCUMENTS 5,917,425 A 6/1999 Crimmins et al.
6,657,549 B1 12/2003 Avery
(Continued)

FOREIGN PATENT DOCUMENTS

| EP | 1439649 A1 | 7/2004 |
|---|---|---|
| WO | 2008006077 A2 | 1/2008 |
| WO | 2012175957 A1 | 12/2012 |

OTHER PUBLICATIONS

Notice of Allowance for U.S. Appl. No. 15/916,861, dated Oct. 4, 2018, 21 pages.
(Continued)

*Primary Examiner* — Huy C Ho
(74) *Attorney, Agent, or Firm* — RatnerPrestia

(57) ABSTRACT

Disclosed are examples of a method, system and asset tag that enables general, coarse and fine estimates of a location of the asset tag. The asset tag receives a signal transmitted from radio frequency (RF)-enabled nodes within a space. Each respective received signal includes a unique node identifier of the respective RF node that transmitted the respective received radio signal. Each RF node has a physical node location in the space that is associated with the unique node identifier. The tag measures the received signal strength of each respective received signal that is associated with the node identifier of the RF node that transmitted the respective received signal. The strongest measured received signal strengths are selected, and a tuple containing the node identifiers for the selected strongest signal strengths is forwarded for estimating a location of the asset tag by a computing device.

18 Claims, 10 Drawing Sheets

(51) Int. Cl.
*G01S 5/08* (2006.01)
*H04B 17/318* (2015.01)

(58) Field of Classification Search
CPC ........ G01S 5/0242; G01S 5/0231; G01S 5/10;
G01S 5/12; G01S 5/14; G01S 5/145;
G01S 5/20; G01S 5/22; G01S 5/24; G01S
5/26; G01S 5/28; G01S 5/30; G01S
13/876; G01S 13/878; G01S 13/874;
H04B 17/318; H04B 7/18552
USPC ...................................................... 455/456.1
See application file for complete search history.

(56) References Cited

U.S. PATENT DOCUMENTS

| | | | |
|---|---|---|---|
| 6,862,430 B1 | 3/2005 | Duffy et al. | |
| 7,312,752 B2 | 12/2007 | Smith et al. | |
| 7,324,824 B2 | 1/2008 | Smith et al. | |
| 7,372,365 B2 | 5/2008 | Jackson | |
| 7,528,716 B2 | 5/2009 | Jackson | |
| 7,545,326 B2 | 6/2009 | Caliri et al. | |
| 7,577,444 B2 | 8/2009 | Bird et al. | |
| 7,602,338 B2 | 10/2009 | Smith et al. | |
| 7,719,418 B2 | 5/2010 | Grossman | |
| 7,791,470 B2 | 9/2010 | Karr | |
| 7,872,581 B2 | 1/2011 | Darianian et al. | |
| 7,941,096 B2 | 5/2011 | Perkins et al. | |
| 7,965,174 B2 | 6/2011 | Wong et al. | |
| 8,019,354 B2 | 9/2011 | Rae et al. | |
| 8,026,814 B1 | 9/2011 | Heinze et al. | |
| 8,031,120 B2 | 10/2011 | Smith et al. | |
| 8,089,344 B1 | 1/2012 | Zand | |
| 8,149,090 B2 | 4/2012 | Hall et al. | |
| 8,155,664 B2 | 4/2012 | MacFarland | |
| 8,294,568 B2 | 10/2012 | Barrett | |
| 8,305,190 B2 | 11/2012 | Moshfeghi | |
| 8,373,562 B1* | 2/2013 | Heinze | G06Q 10/06 340/572.1 |
| 8,400,268 B1 | 3/2013 | Malik et al. | |
| 8,531,273 B2 | 9/2013 | Overhultz et al. | |
| 8,558,672 B2 | 10/2013 | Zand | |
| 8,598,988 B2 | 12/2013 | Overhultz et al. | |
| 8,674,806 B1 | 3/2014 | Malik et al. | |
| 8,674,829 B2 | 3/2014 | Karam et al. | |
| 8,787,961 B2 | 7/2014 | Skalicky | |
| 8,854,205 B2 | 10/2014 | Daniel | |
| 8,867,993 B1 | 10/2014 | Perkins et al. | |
| 9,100,788 B2 | 8/2015 | Karam et al. | |
| 9,138,825 B2 | 9/2015 | Albrect et al. | |
| 9,324,202 B2 | 4/2016 | Lindig et al. | |
| 9,436,858 B2 | 9/2016 | Liao | |
| 9,525,969 B2 | 12/2016 | Evans et al. | |
| 9,711,047 B1 | 7/2017 | Knas et al. | |
| 9,711,048 B1 | 7/2017 | Knas et al. | |
| 9,721,451 B1 | 8/2017 | Knas et al. | |
| 9,741,237 B1 | 8/2017 | Knas et al. | |
| 9,877,266 B1 | 1/2018 | Knas et al. | |
| 9,877,298 B1 | 1/2018 | Knas et al. | |
| 9,881,484 B1 | 1/2018 | Knas et al. | |
| 9,949,091 B1 | 4/2018 | Knas et al. | |
| 9,984,556 B1 | 5/2018 | Knas et al. | |
| 10,210,353 B1 | 2/2019 | Li et al. | |
| 10,834,528 B2* | 11/2020 | Akpinar | G01S 1/042 |
| 2006/0097046 A1 | 5/2006 | Fassio et al. | |
| 2008/0231449 A1 | 9/2008 | Moshfeghi | |
| 2009/0284367 A1* | 11/2009 | Pfafman | G08B 21/0238 340/539.1 |
| 2010/0110948 A1 | 5/2010 | Batta | |
| 2010/0214116 A1 | 8/2010 | Huang et al. | |
| 2011/0012782 A1 | 1/2011 | Lee et al. | |
| 2012/0001728 A1 | 1/2012 | Janiszewski | |
| 2012/0050101 A1 | 5/2012 | Whiteman | |
| 2012/0119883 A1 | 5/2012 | Bekritsky | |
| 2012/0158238 A1 | 6/2012 | Daley et al. | |
| 2013/0072223 A1 | 3/2013 | Berenberg et al. | |
| 2013/0342402 A1 | 12/2013 | Pesonen | |
| 2015/0085669 A1 | 3/2015 | Prechner et al. | |
| 2015/0105099 A1* | 4/2015 | Luo | G01S 5/0252 455/456.1 |
| 2016/0026837 A1 | 1/2016 | Good et al. | |
| 2017/0006411 A1 | 1/2017 | Zakaria et al. | |
| 2019/0095852 A1 | 3/2019 | Sanjau et al. | |

OTHER PUBLICATIONS

U.S. Appl. No. 15/916,861, filed Mar. 9, 2018, 57 pages.
Beutel, J., "Geolocation in a PicoRadio Environment," Diploma Thesis, Jul. 1999, 121 pages.
Saavides et al., "Dynamic Fine-Grained Localization in Ad-Hoc Networks of Sensors," accepted for publication to Mobicon 2001, 14 pages.
Non Final Office Action for U.S. Appl. No. 15/916,893, dated Dec. 14, 2018, 39 pages.
U.S. Appl. No. 15/916,893, filed Mar. 9, 2018, 51 pages.
Notice of Allowance isued in U.S. Appl. No. 16/295,523, dated Jul. 29, 2019, 43 pages.
Entire patent prosecution history of U.S. Appl. No. 15/916,893, filed Mar. 9, 2018, now U.S. Pat. No. 10,422,848, issued Sep. 24, 2019, entitled "More Accurate Asset Tag Locating of Radio Frequency Devices."
Canadian Examination Report for Canadian Application No. 3,035,857, dated Nov. 20, 2020, 8 pages.
Notice of Allowance issued in U.S. Appl. No. 16/262,185, dated Aug. 11, 2020, 5 pages.

* cited by examiner

FIG. 7

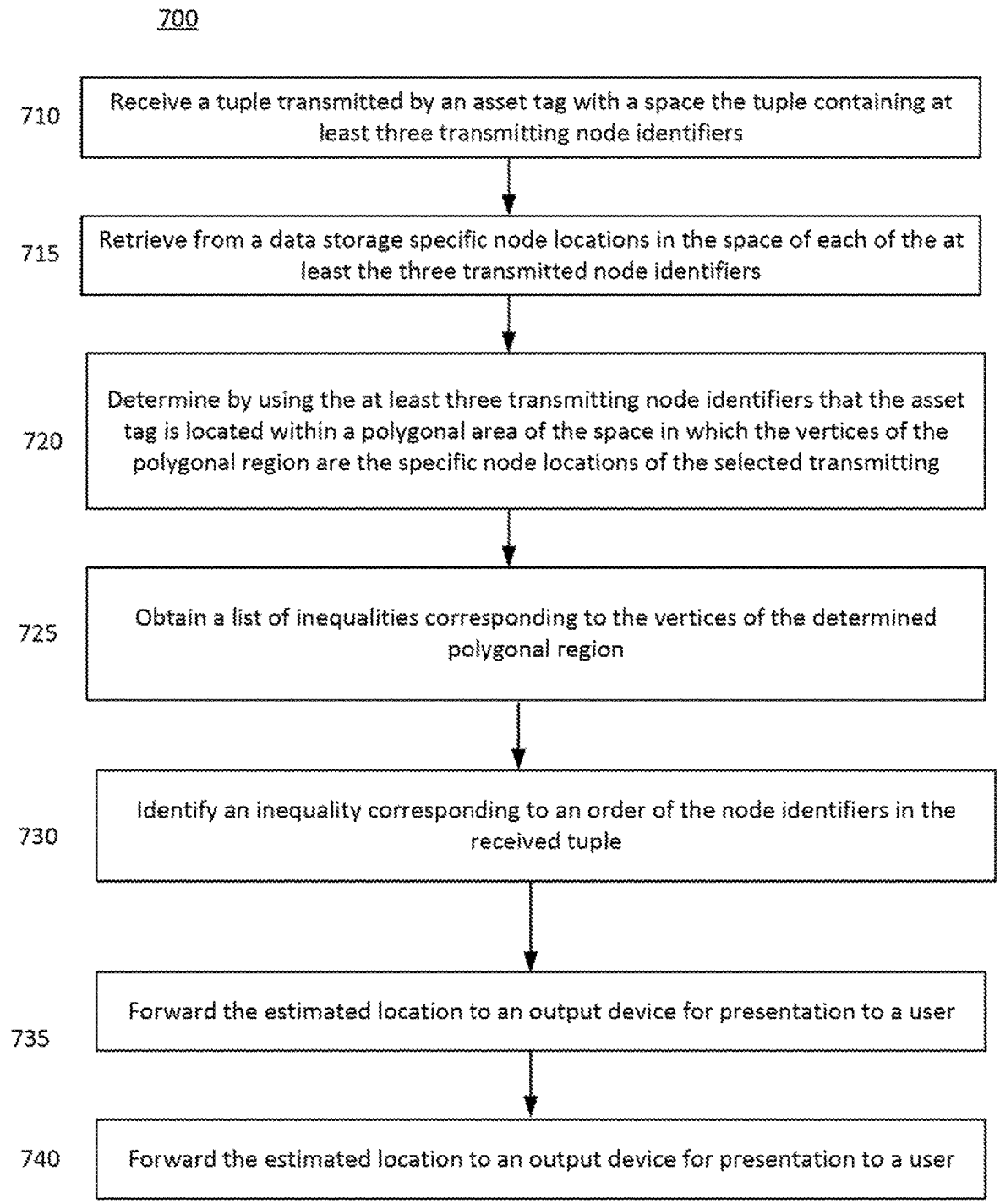

710 — Receive a tuple transmitted by an asset tag with a space the tuple containing at least three transmitting node identifiers 715 — Retrieve from a data storage specific node locations in the space of each of the at least the three transmitted node identifiers 720 — Determine by using the at least three transmitting node identifiers that the asset tag is located within a polygonal area of the space in which the vertices of the polygonal region are the specific node locations of the selected transmitting 725 — Obtain a list of inequalities corresponding to the vertices of the determined polygonal region 730 — Identify an inequality corresponding to an order of the node identifiers in the received tuple 735 — Forward the estimated location to an output device for presentation to a user 740 — Forward the estimated location to an output device for presentation to a user

MORE ACCURATE ASSET TAG LOCATING OF RADIO FREQUENCY DEVICES

CROSS-REFERENCE TO RELATED APPLICATION

This patent application is a continuation of U.S. patent application Ser. No. 15/916,893, filed Mar. 9, 2018, entitled "MORE ACCURATE ASSET TAG LOCATING OF RADIO FREQUENCY DEVICES," the entire contents of which are incorporated herein by reference.

This patent application is related to U.S. patent application Ser. No. 15/916,861, filed Mar. 9, 2018, entitled "ASSET TAG TRACKING SYSTEM AND NETWORK ARCHITECTURE," now U.S. Pat. No. 10,210,353, issued Feb. 9, 2019, the entire contents of which are incorporated herein by reference.

TECHNICAL FIELD

The disclosed subject matter relates to improvements in the estimation of the location of radio frequency (RF) enabled asset tags that are in communication with RF beacons, such as those at ceiling level that may be incorporated into luminaires.

BACKGROUND

Asset tracking systems in previous systems relied upon the detection of an asset tracking device by a radio frequency detection device. For example, the asset would pass by the detection device and the detection device would by some detection means detect a "tag" or other identifier attached to the asset. The asset tracking system would know the location of the asset because the system would have knowledge of the location of the detection device. An example of a radio frequency detection means may include engaging a radio frequency identifying (RFID) tag or the like attached to the asset. Like a barcode, the RFID tag may provide information about the asset.

The known asset tracking systems employing radio frequency detection means usually require the detection means to actively engage the tag attached to the asset being tracked. Other examples include more complex asset tracking tags that may communicate with devices within the location in order to update information related to the tag or its location, and report the location of an asset through wireless radio frequency communication. The transmission of position updates and data reporting causes the asset tracking tag to continuously operate in a high power consumption state.

Locations of radio devices (e.g., tags) in an area served by a network of RF beacons having known locations can be estimated by a variety of means in the prior art. Received signal strength of signals transmitted by a tag, a RF beacon, or both may be measured by a tag and/or the RF beacon, and used as a proxy for node-to-tag distance (assuming that all nodes transmit signals of equal strength): the farther away the transmitting tag/node, the lower the received signal strength. Present systems require the transmission of the RSS values as well as additional information for the determination of the location of an asset tag. However, this continuous processing of and transmission of data consumes power and adds traffic to the RF communication channels.

SUMMARY

Hence, a need exists for a method of automated tag location estimation that exploits the configuration properties of a network of RF nodes, e.g., BLE nodes in a positioning network, while requiring the transmission of relatively little data from each tag and providing greater estimation accuracy than the prior art.

Disclosed are examples of a method, which includes receiving, by an asset tag, a radio signal transmitted from each of three or more radio frequency-enabled nodes within a space. Each respective received radio signal includes a unique node identifier of the respective radio frequency-enabled node that transmitted the respective received radio signal. The unique node identifier is associated with a specific node location in the space of the respective radio frequency-enabled node. A received signal strength of each respective received radio signal is measured. A respective transmitting node identifier is obtained from each of at least three of the respective received radio signals whose measured received signal strengths are strongest. A tuple containing an ordered list of at least three transmitting obtained node identifiers sorted by the respective measured received signal strengths is generated. The tuple is forwarded to a tag location estimating application.

In another example, an asset tag located in a space configured with at least three of the radio frequency-enabled nodes operating within a data communication network installed in the space is disclosed. The asset tag within the space includes logic circuitry, a memory coupled to the logic circuitry, radio frequency receiver circuitry, and radio frequency transmitter circuitry. The logic circuitry configures the asset tag to perform functions, including functions to: receive, via the radio frequency receiver circuitry, a radio signal transmitted from each of the at least three of the radio frequency-enabled nodes within a space. The received signal strength of each respective received signal is measured. A respective transmitting node identifier is obtained from each of three of the respective received radio signals whose measured received signal strengths are from the measured received signal strengths that are strongest. A tuple is generated containing the three obtained transmitting node identifiers in an order. The generated tuple is forwarded to a server coupled to the data communication network in the space.

In another example, a system includes a plurality of radio frequency-enabled nodes located within a space, an asset tag with the space and a server. The server may be coupled via a radio frequency communication data link provided by one of the plurality of nodes to the asset tag. Each of the plurality of nodes being configured to emit a radio frequency signal including a unique node identifier of the radio frequency-enabled node. The unique node identifier is associated with a specific node location in the space. The asset tag within the space includes logic circuitry, a memory coupled to the logic circuitry, radio frequency receiver circuitry, and radio frequency transmitter circuitry. The logic circuitry configures the asset tag to perform functions, including functions to receive, via the radio frequency receiver circuitry, a node-unique radio signal transmitted from at least three of the radio frequency-enabled nodes of the plurality of nodes within a space. The received signal strength of each respective received signal is measured. A respective transmitting node identifier is obtained whose measured received signal strength is among the measured received signal strengths that are strongest. A tuple is generated containing at least three of the obtained node identifiers. The generated tuple is forwarded to the server. The server is configured to receive the generated tuple forwarded from the asset tag; and estimate, based on the generated tuple and the specific node locations associated with the obtained node identifiers, a location of the asset tag with respect to a respective specific node location of each of the three obtained node identifiers in the generated tuple.

Another example of a method is disclosed, the disclosed method including receiving, from an asset tag coupled to a data communication network, a tuple containing at least three wireless node identifiers. The at least three wireless node identifiers are ordered in the tuple according to a strongest ranked signal attribute to a lowest ranked signal attribute of signals received from wireless nodes associated with each of the at least three wireless node identifiers. Data indicating a node location for the wireless nodes identified by the at least three selected transmitted node identifiers are retrieved. Based on the order of the at least three wireless node identifiers in the received tuple and the retrieved data indicating the node location for each wireless node associated with the at least three node identifiers, a location of the asset tag with respect to the specific node locations of the at least three node identifiers is estimated. The estimated asset tag location is forwarded to an output device for presentation to a user.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The figures depict one or more implementations in accordance with the present teachings by way of example only, not by way of limitation. In the figures, like reference numbers refer to the same or similar elements.

FIG. 7 is another flow diagram of a process example illustrating a process for estimating a location of an asset tag within a space.

DETAILED DESCRIPTION

Figure 1:
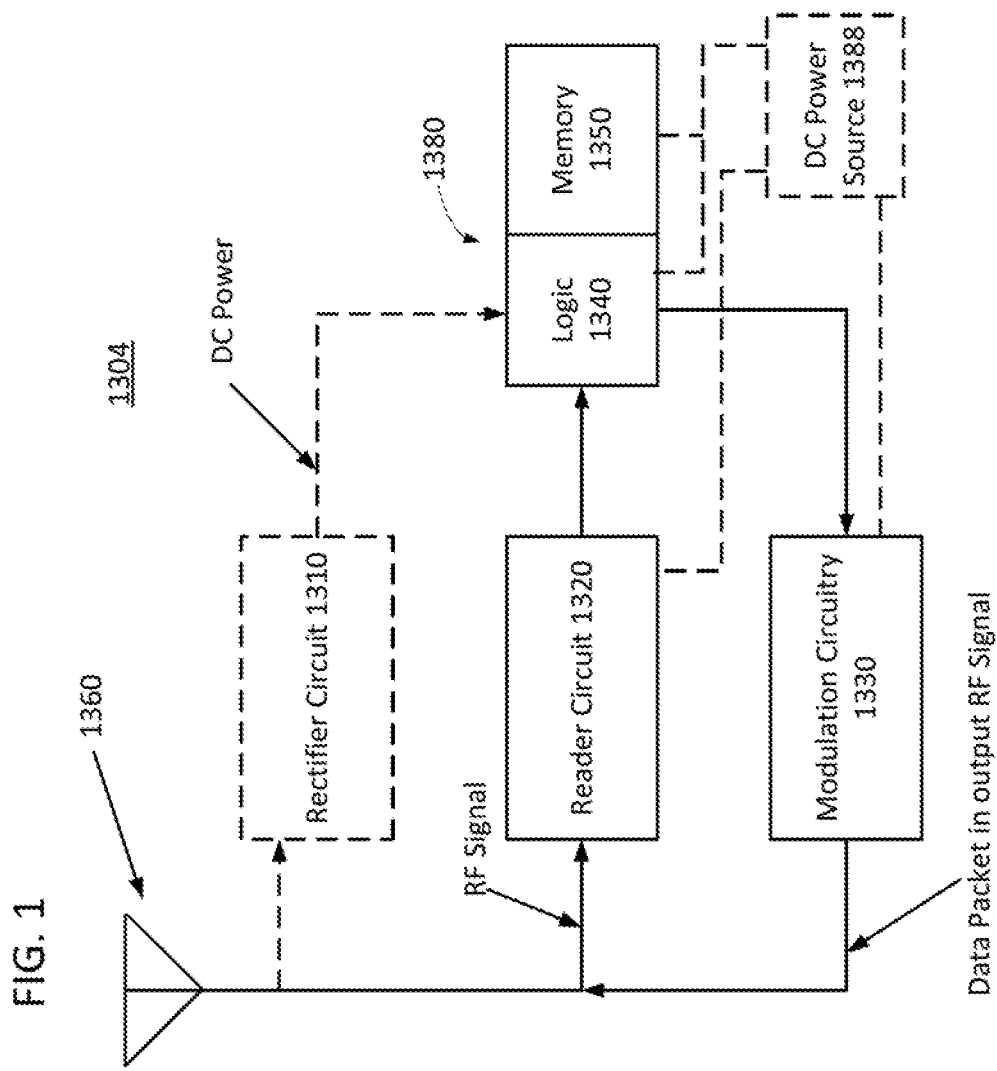
FIG. 1 illustrates a functional block diagram of an example of an asset tag usable with the examples described herein.

In the following detailed description, numerous specific details are set forth by way of examples in order to provide a thorough understanding of the relevant teachings. However, it should be apparent that the present teachings may be practiced without such details. In other instances, well-known methods, procedures, and/or components have been described at a relatively high level, without detailed comment in order to avoid unnecessarily obscuring aspects of the present teachings.

The term "luminaire" as used herein is intended to encompass essentially any type of device that processes power to generate light, for example, for illumination of a space intended for use of or occupancy or observation. A luminaire, for example, may take the form of a lamp, light fixture or other lighting device that incorporates a source, where the source by itself contains no intelligence or communication capability (e.g. LEDs or the like, or lamp ("regular light bulbs") of any suitable type) and an associated modulator and logic circuitry. Alternatively, a fixture or luminaire may be relatively dumb but include a source device (e.g. a "light bulb"). Luminaires, such as light fixtures, floor or table lamps, or other types of lighting devices for artificial general illumination are widely used in various residential, commercial and industrial settings for providing illumination in both interior and exterior spaces. For example, a retail store may install multiple luminaires in the ceiling for illuminating products and walking area throughout an indoor area, such as a store.

The term "node" may refer to an RF-enabled communication device that may provide communication services, e.g. for positioning services, building control system management services and the like. A node may be a connection point in a network that can receive, create, store and/or send data via communication links within the network. Each node is configurable to transmit, receive, recognize, process and originate and/or forward transmissions to other nodes, other devices operating as an access point to a network, or outside the network. The communication services provided by a node may enable networked and non-networked devices, such as asset tags, to send data to a node and receive data from the node.

Also, an "indoor" system is a system that provides positioning services and in some cases additional services over any relatively limited area. The area so served may be partly or entirely confined within a building, ship, mine, or other enclosed structure, but is not necessarily so confined. Hence, an "indoor" positioning system may operate partly or wholly in unenclosed spaces, e.g., over a campus, pedestrian mall, fairground, or the like, where such a service area may also include the interiors of one or more enclosures. Moreover, the spaces or areas served by a single system may not all be contiguous (e.g., the system may distinguish between a number of spaces at somewhat separate locations and support navigation between as well as within those spaces). Also, although reference is made primarily to positioning services that discover and utilize information about asset tag locations in flat "areas" over which a two-dimensional coordinate system is appropriate (e.g., the floor space of a store), the technologies discussed below are applicable to systems discovering and utilizing information about asset tag locations in three-dimensional spaces.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

In the following examples, an "asset tag" may be a movable device, preferably associated with a specific person or object, capable of (1) receiving radio signals from network nodes, (2) measuring an attribute (e.g. the power as in the received signal strength (RSS)) of each received signal, (3) extracting transmitter-specific identification codes from received signals, (4) performing computations, and (5) broadcasting information to the node network for relay to the computational back end. A tag may also have additional capabilities as may be described with reference to the following examples.

The asset tag, systems and processes for improved location estimate accuracy in the following examples provide various degrees of location estimate accuracy without having to transmit any additional data beyond the tag identifier and a select number of node identifiers of nodes that transmitted signals received by the asset tag, in some examples, while only having to transmit minimal additional data to the tag identifier and a select number of node identifiers of nodes that transmitted signals received by the asset tag in other examples. The described examples enable a general location estimate (e.g. within an area bounded by nodes M, N and O), a coarse location estimate (e.g. within an area bounded by nodes M, N, O but closer to N than M or O), and a fine location estimate (e.g. near Y but likely in this directions and relative distance from Y).

Reference now is made in detail to the examples illustrated in the accompanying drawings and discussed below.

FIG. 1 is a functional block diagram of an example of an asset tag usable with the examples described herein. Depending upon whether the asset tag 1304 is an active tag or a passive tag, the asset tag 1304 may have different types of components related to how the asset tag 1304 is powered. For example, in the case in which the asset tag 1304 is an active tag, the power source may be a dedicated source of power, such as a battery, a solar cell, or the like. Conversely, if the asset tag 1304 is a passive tag, the asset tag will obtain and/or convert energy from sources not dedicated to providing power the asset tag 1304 for use to perform functions. For example, the passive tag may use the energy of a received signal to provide power via circuitry, such as rectifying circuit 1310, to generate power either for immediately powering the logic circuitry 1340 or for storage and later use.

Radio frequency signal transmissions from one or more nodes as described in the following examples may be received by one or more tags 1304. When configured as a passive tag, asset tag 1304 includes an antenna 1360, rectifier circuitry (e.g., a capacitor, diodes or the like) 1310, reader circuitry 1320, an information processing circuitry 1380, and a modulation circuit 1330.

The tag antenna 1360 is capable of both receiving radio frequency (RF) signals and of transmitting radio frequency signals. When the antenna 1360 receives RF signals some of the energy in the RF signals is converted by the rectifier circuitry 1310 into direct current (DC) power. In the case of a passive tag configuration to tag 1304, if the received signal has sufficient signal strength, the converted DC power is sufficient to supply power to the other components of the tag 1304. For example, with sufficient DC power, the information processing circuitry 1380 may be powered for some interval. The received signal is also input to the reader circuit 1320 which may be configured to process the input signal and output data representative of the intended recipient message. The information processing circuitry 1380 may include logic circuitry (or simply "logic") 1340 and a memory 1350. The memory 1350 may store an address of the tag 1304 and other information related to the tag 1304. The logic 1340 of information processing circuitry 1380 may be configured to perform functions that include the processing of signals received through the antenna 1360 utilizing the logic circuitry 1340 and transmitting information (e.g., a unique identifier of the node that transmitted the received signal) through the antenna 1360.

Functions performed by the information processing circuitry 1380 may include, for example, determining a received signal strength of a signal received from a node and obtaining a respective transmitting node identifier from each of three of the respective received radio signals having strongest measured received signal strengths. The obtaining function may include extracting an identifier of the transmitting node from the received signal. This information may be stored in memory 1350 of the asset tag 1304. The logic 1340 may be configured to retrieve a stored node identifier from the memory 1350, and to generate a data packet that includes the tag address and the node identifier of the node that transmitted the received signal. The generated data packet may be forwarded to the modulation circuitry 1330, and be transmitted from the tag 1304 via the antenna 1360.

In addition, the information processing circuitry 1380 may be configured to measure a received signal strength (RSS) of a signal transmitted by a node. The measured RSS may have, or may be converted into, an RSS indicator value as will be described in more detail with reference to other examples. The RSS measurement capabilities of the logic 1340 may be available to a passive tag implementation as well as an active tag implementation.

If more processing capabilities are needed, the tag 1304 may be configured to receive DC power from a DC power source 1388 in which case the tag 1304 operates as an active tag. When implemented as an active tag, the tag 1304 receives sufficient power form the DC power source 1388 to enable operation of the reader circuit 1320, the modulation circuitry 1330, the logic 1340 and the memory 1350. The tag 1304 when implemented as an active tag may be configured to perform functions such as those described with reference to the examples of FIGS. 2-6.

Figure 2:
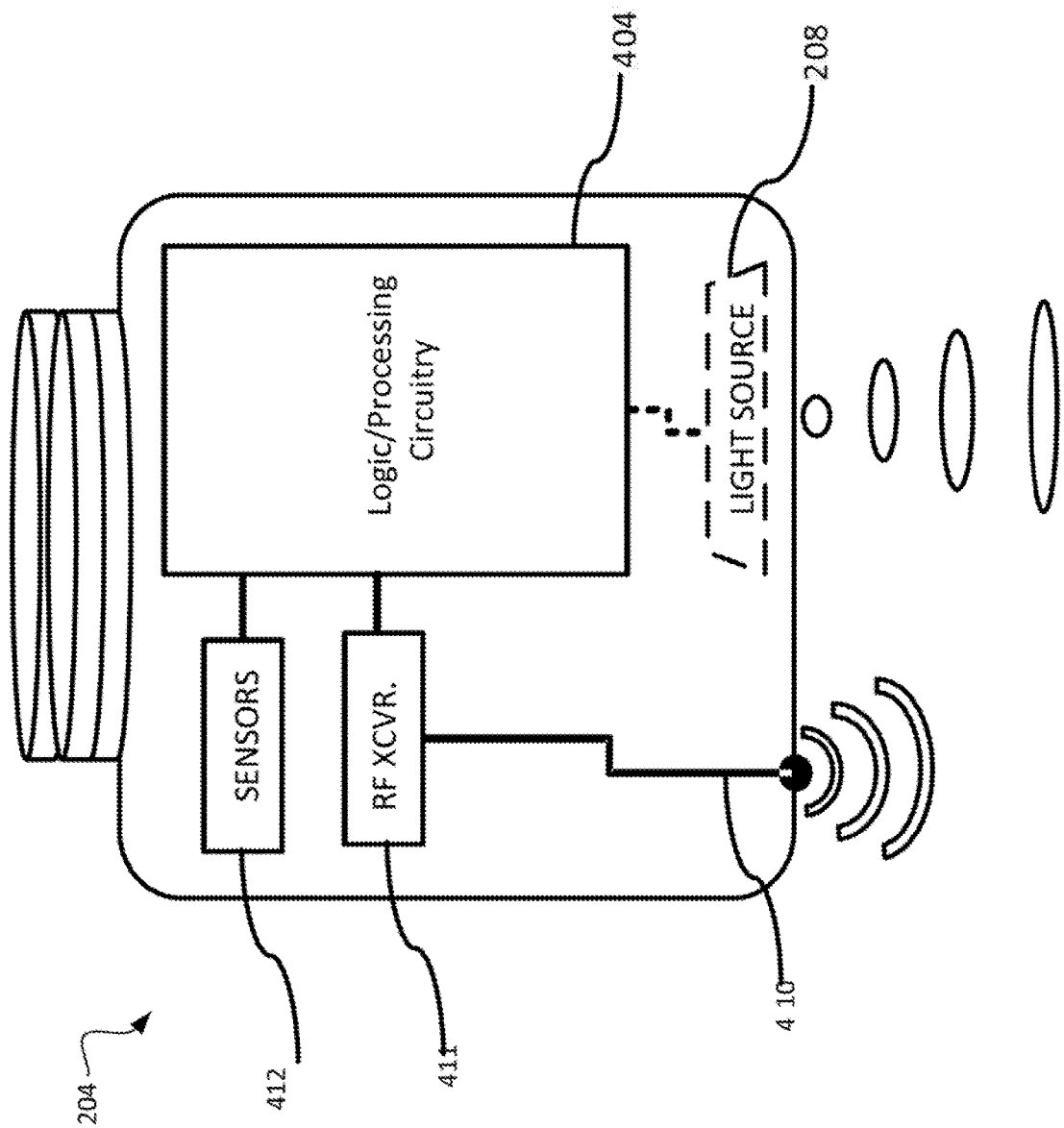
FIG. 2 is a simplified functional block diagram of an RF enabled lighting device.
Figure 3:
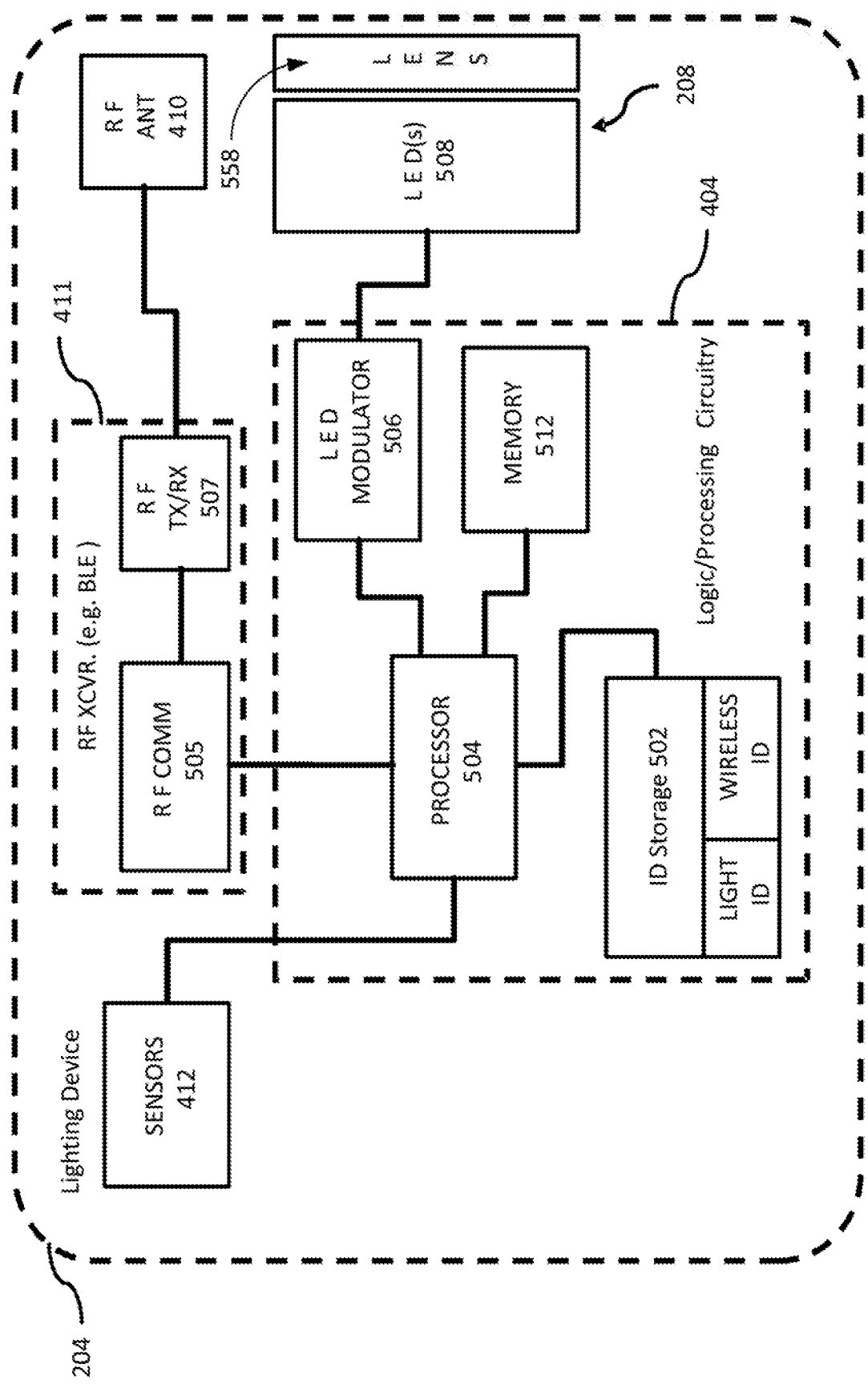
FIG. 3 depicts a more detailed example of an RF enabled lighting device such as that of FIG. 2.

FIG. 2 is a somewhat schematic illustration and a somewhat block diagram type representation of one of the lighting devices 204; and FIG. 3 is a somewhat more detailed functional block diagram showing possible implementations of several elements of the example of the lighting device 204 of FIG. 2. Reference numbers used in common in both of these drawings refer to the same items. For convenience, the description of these examples will refer to both drawings together, unless otherwise noted.

The example of a lighting device 204 in FIGS. 2 and 3 includes logic and/or processing circuitry 404 to drive and control operations of a light source 208 and control operations of other elements of the device 204. The light source 208 may be any suitable device capable of generating light in response to power that can be modulated. In the example of FIG. 3, one or more light emitting diodes (LEDs) 508 form the light source 208. The device 204 may include an optical processing element, such as 558, coupled to process the light output from the LEDs 508 in which both may form the light source 208. Although other optical processing elements may be used, such as diffusers, reflectors and the like, the example of FIG. 3 shows a lens 558.

The logic and/or processing circuitry 404 may include elements such as a processor 504, a modulator (i.e. LED modulator 506 in the example of FIG. 3) to supply and modulate power to the source 208, and a memory 512 as a storage device for programming and data.

Although purpose built logic circuitry could be used, the processor 504 typically is implemented by a programmable device such as a microprocessor or a microcontroller, configured to execute programs and process data that facilitate modulation of light from one or more LEDs 508. The ID storage 502 and memory 512 may be implemented as separate circuit elements coupled to/accessible by the processor 504, e.g. if the processor is a microprocessor type device. A microcontroller typically is a 'system on a chip' that includes a central processing unit (CPU) and internal storage; therefore a microcontroller implementation might incorporate the processor 504, ID storage 502 and memory 512 within the microcontroller chip.

The processor 504 controls the LED modulator 506 to vary the power applied to drive the LEDs 508 to emit light. This control capability may allow control of intensity and/or color characteristics of illumination that the light source 208 provides as output of the lighting device 204. Of note for purposes of discussion of position system operations, this control capability causes the modulator 506 to vary the power applied to drive the LEDs 508 to cause code modulation of light output of the light output of the light source 208, including modulation to carry a currently assigned lighting device ID code from the secure storage 502. The processor and/or modulator may be configured to implement any of a variety of different light modulation techniques.

As noted, the lighting devices 204 in our examples utilize wireless links to communicate, although other communication media and technologies may be adapted to carry communications discussed herein to and/or from the RF-enabled lighting devices 204. Hence, the wireless examples of FIGS. 2 and 3 include a radio frequency (RF) wireless transceiver (XCVR) 411 coupled to the logic and/or processing circuitry 404. The transceiver 411 in turn is coupled to an RF transmit/receive antenna 410 that may facilitate communication over wireless RF signals to and/or from other similarly equipped proximal devices, such as other lighting devices 204, mobile devices 218 or 219, wireless gateway router 220 or other wireless routers or relays, wireless enabled computing devices generally, RF equipped items such as appliances, tools, entertainment devices, RF tags, RF enabled network access points, multi-radio devices, and the like. The RF communication capability offered by transceiver 411 and the antenna 410 supports the various data communications of the lighting device.

The RF transceiver 411 of FIG. 3 may conform to any appropriate RF wireless data communication standard such as wireless Ethernet (commonly referred to as Wi-Fi), Bluetooth, or Zigbee. In the example, the RF transceiver 411 is a Bluetooth wireless transceiver, more specifically conforming to the Bluetooth Low Energy (BLE) standard. At a still relatively high level, the BLE transceiver 411 may include RF communication circuitry 505 coupled to the processor 504 and RF transmit (TX) and receive (RX) physical layer circuitry 507 coupled to the RF transmit/receive antenna 410.

Figure 4:
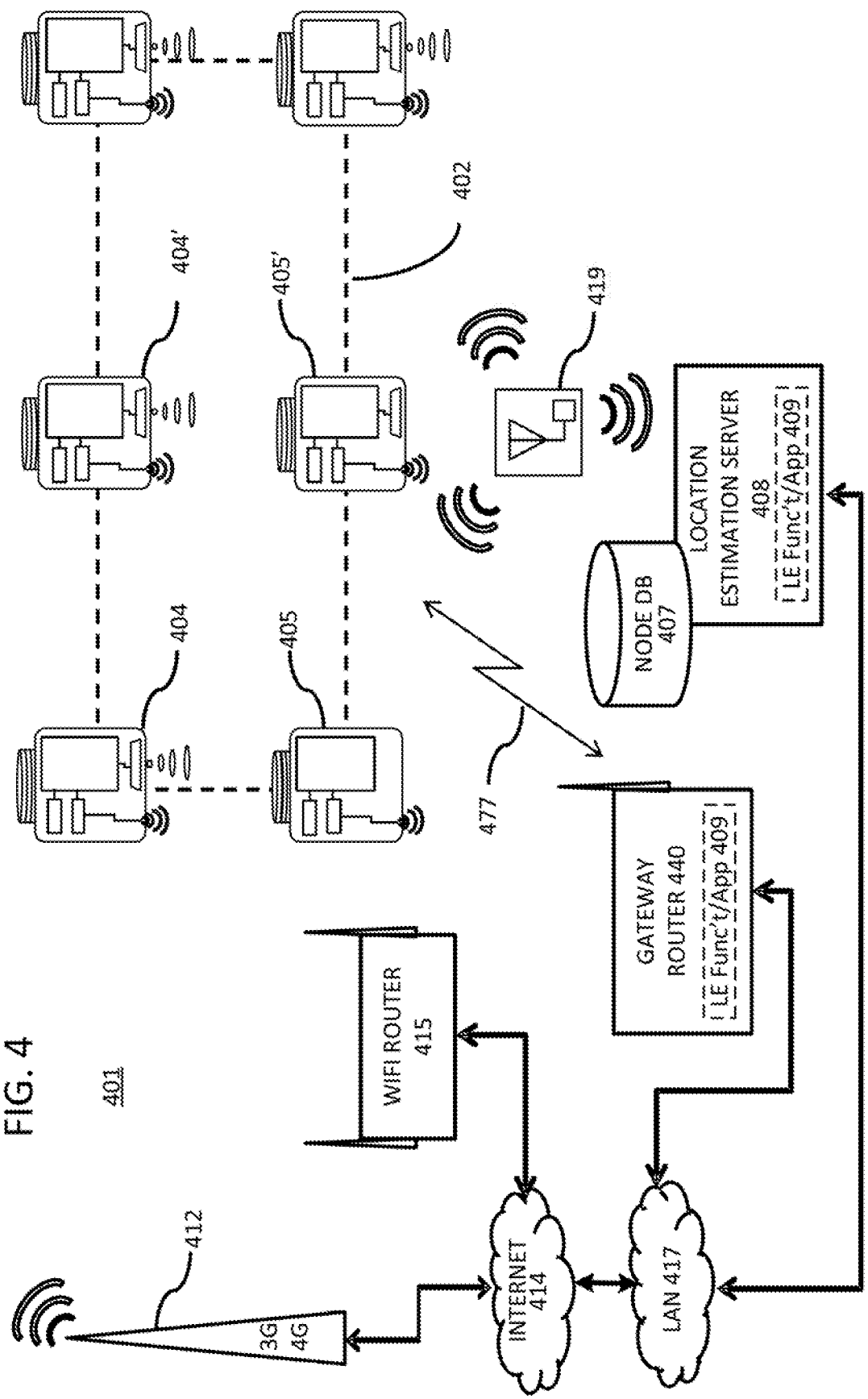
FIG. 4 illustrates a system example of lighting devices and network connected resources, such as a radio-frequency equipped network node and luminaires that support a light-based indoor positioning service for one or more asset tags, such as the asset tag of FIG. 1.

FIG. 4 shows a lighting and positioning system and components in communication with such a lighting and positioning system 401. The lighting devices 404 and 404' may have the capability to modulate output of the light sources thereof, e.g. for visual light communication (VLC) such as for position related operations. The lighting and positioning system includes the actual lighting devices 404 and other resources such as server(s) 408 and database 407 that interact with the lighting devices 404, 404' for asset tag location estimation and/or other position-related functions.

The lighting devices 404, 404' and 405, 405' in our examples include wireless transceivers, such as radio-frequency transceivers, for various wireless communication and/or positioning functions. For some communication and networking functions the lighting devices 404 may be coupled to one another via cable or optical fibers communication resources. In the overall system 401 shown in FIG. 4, an asset tag 419 or the like communicates with one or more of the RF enabled lighting devices 404 or 405, 405' over a short range RF wireless link, for example, to implement communication aspects of an indoor positioning system. In the overall system 401, the RF enabled lighting devices 404 or 405, 405' may form an ad hoc mesh-type network 402 and may provide information usable to determine the position tag 419 position information to a gateway router 440, to implement location estimation or location determination functions.

In the system 401, the asset tag 419 communicates with the one or more RF enabled lighting devices 404 or 405, 405' within the ad hoc mesh-type network 402. As noted, the networked system 401 of FIG. 4 implements a wireless, such as Bluetooth or the like, ad hoc network 402 formed by the wireless-enabled lighting devices 404. Assuming that the ad hoc network 402 has a link to a compatible wireless gateway router such as 440, then the ad hoc network 402 and the gateway router 440 may offer a data communication path for the asset tag 419, including for data communications related to the positioning and location based services.

The configuration of RF enabled lighting devices 404 arranged in an ad hoc mesh-type network 402 and connected to Internet resources through a nearby gateway router 440. Lighting devices 404 may be configured so that an RF signal emitted from the RF transceiver, such as 507 of FIG. 3, of each device 404 may be distinguished from RF signals output by other nearby RF-enabled lighting devices 404'.

A network capability as depicted in FIG. 3 may include access through a mobile device or other RF enabled device to external (non-mesh) networks. A network-network gateway 440 in close proximity to one of the networked lighting devices 404 may enable communication from at least one of the lighting devices and thus the network 402 through any suitable wireless networking link such as Ethernet, Zigbee, and the like.

In the example of FIG. 4, the RF-enabled lighting devices in the network 402 may access via a gateway such as gateway router 440, a local area network (LAN) 417 resource, such as a location estimation server 408, to communicate to networked lighting devices 404 or 404' by passing data through the Internet 414. This may allow communication of information collected from asset tags, such as 419, via the RF capability (e.g., identities of asset tags) by one of the lighting devices to a remote server, such as server 408.

In various examples, the location estimation server 408 may be a general-purpose mesh server and controller (back end) specially configured to perform functions other than or additional to position determination, issuing commands to the RF and/or lighting capabilities of one or many network nodes, polling network nodes for information garnered from sensors, and so on. The tag location estimating application 409 may be special programming stored in a memory that is accessible and executable by a general purpose computing device, such as location estimation server 408. A general-purpose back end may be specially configured to understand the locations, movements, and other aspects of asset tag 419, networked lighting devices 404 or 404' and other asset tags within the service area of the network 402.

Illustrative capabilities include RF asset tag location tracking, robot and drone tracking, routine customer assistance, emergency assistance, and more. In another example, routine scan (advertising) packet broadcasts from Bluetooth-capable mobile devices are detected by the RF capability of nodes, enabling a mode of position estimation of the asset tag 419 based on received signal strength (RSS) indication and/or node detection pattern. Such estimates may be combined with estimates based on detection of VLC beacons by a light-sensing capability of the mobile device, e.g., after the device user is prompted to expose their device to light based on detection of their presence by the RF mode.

As shown in FIG. 4, the location estimation functionality or application 409 may be implemented on location estimation server 408 or as additional programming on the same computer implementing the gateway router 440. Alternatively, the tag location estimation application 409 of location estimation server 408 may be implemented on a separate network connected computer platform. For example, the location estimating functionality/application 409 of FIG. 4 may be special programming stored in a memory, e.g., node database 407 of FIG. 4 or other memory, which is executable by a general purpose computing device, such as location estimation server 408. In addition or alternatively, aspects of the tag location estimating application 409 may be executed by the gateway router 440. The server 408 functionality may be implemented in a distributed fashion on multiple network connected computers, e.g. to adequately serve a particular traffic load and/or to provide some level of redundant capacity for peak load or for use in the event of a failure of a primary server resource. The node database 407 may be implemented in a storage device of the computer(s) that implements the server 408, or the node database 407 may be implemented in a network connected storage device accessible to the appropriate server computer(s).

Locations of asset tags in an area served by a network of RF enabled lighting devices having known locations can be estimated using various techniques. For example, an RSS measured by an asset tag is a proxy for node-to-tag distance (assuming that all nodes transmit signals of equal strength): the farther away the transmitting node, the lower the RSS, and the closer the transmitting node, the higher the RSS. As a result, the RSS measurements without more provide enough information usable for position estimation.

It may be helpful at this time to describe a system example with respect to FIG. 4. The network 401 of FIG. 4 may include radio frequency-enabled nodes, such as 404 and 405, 405', and an asset tag, such as 419, within a space. The system 401 may also include a server, such as 408, that may or may not be located within the space in which the radio frequency-enabled nodes 404, 405, 405' and asset tag 419 are located. The nodes may be arranged in a network 402. Each of the nodes 404 or 405, 405' may be configured to emit a radio frequency signal that includes a node identifier uniquely identifying the radio frequency-enabled node that transmitted the signal from other nodes in the network 402. The server 408 may be coupled to a database, such as 407, that stores the unique node identifier in association with a specific node location in the space. The server 408 may also be coupled via a radio frequency communication data link, such as 477, provided by one of the nodes to the asset tag 419. In an example, the server 408 may be configured, upon execution of programming code to perform functions including functions to receive a tuple (described in more detail with reference to other examples) forwarded from the asset tag, and estimate a location of the asset tag with respect to the specific node locations of the three obtained node identifiers. The server 408 may perform the estimate based on the forwarded tuple and the specific node locations associated with the obtained transmitting node identifiers.

The asset tag 419 may be configured, for example, similar to the tag 1304 of FIG. 1, and may include logic circuitry 1340, a memory, such as 1350, radio frequency receiver circuitry, such as reader circuitry 1320, and radio frequency transmitter circuitry, such as modulation circuitry 1330, all of which are coupled to the logic circuitry 1340 as shown in FIG. 1.

Figure 6:
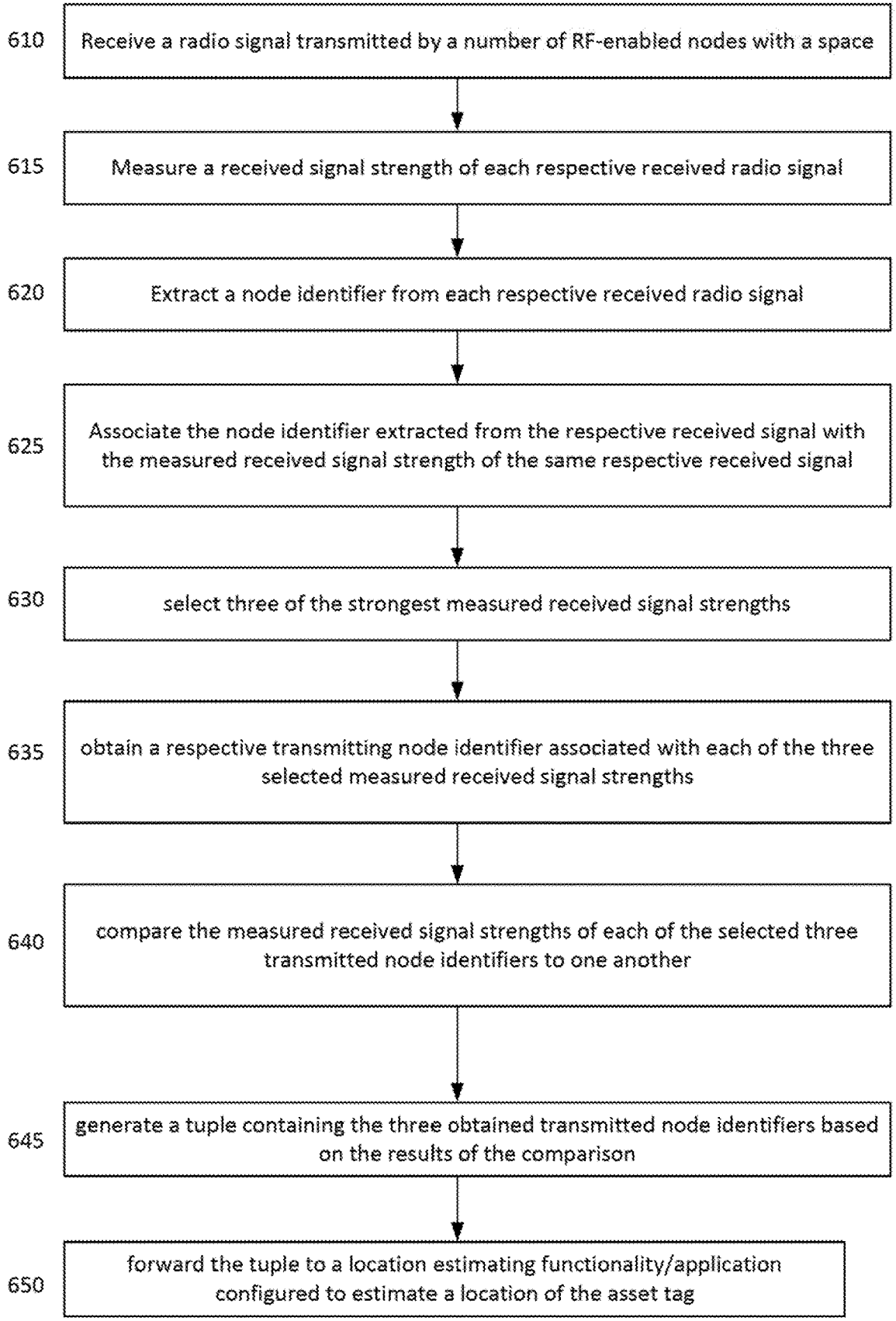
FIG. 6 is a flow diagram of a process example illustrating a process for estimating a location of an asset tag within a space.

The logic circuitry of the asset tag 419 may be configure the asset tag to perform functions such as those described in the example related to FIG. 6. Similarly, the server 408 in the system 401 is also configured to perform functions such as those described with reference to FIG. 7.

The following examples describe a process by which the node identifier associated with the RSS measurement may be used (as part of a tuple) to convey information positional information. In the following discussion, a system and process utilizing the node identifier associated with the RSS measurements having the strongest (or highest) received signal strength values will be described in more detail. An advantage of the described system and process is the ability to transmit a reduced data set and the location of the transmitting asset tag to be determined more accurately based on an ordering of the data within the data set.

It may be appropriate to describe a general process usable for any polygon. In a general example, any point t within a convex polygon having n corners or vertices (h, i, j, etc., where n≥3), there are in general n factorial (n!) inequalities corresponding to n! regions of the polygon. (For certain special polygons the number may be smaller, as in the case of a right triangle) In this discussion, n! is defined as follows:

$$n! = \prod_{k=1}^{n} k$$

For example, if n=3, then n!=1×2×3=6 (which is the triangular case described above). Or if n=4, then n!=1×2×3×4=24 (not shown).

For n=4 (e.g., for 4 nodes h, i, j, k at the corners of a trapezoid), a typical region-specific inequality may read: th<tj<ti<tk. This inequality may be transmitted by an asset tag as the ordered 4-tuple [hjik].

Thus, in this general case, an asset tag identifies the n closest transmitters based on the measured RSS values (i.e. the n closest transmitters having the strongest RSSs, which may include duplicates). While the description herein explains an implementation utilizing 3 nodes as the general case, it is contemplated that other configurations or implementations may use greater than 3 nodes.

Figure 5A:
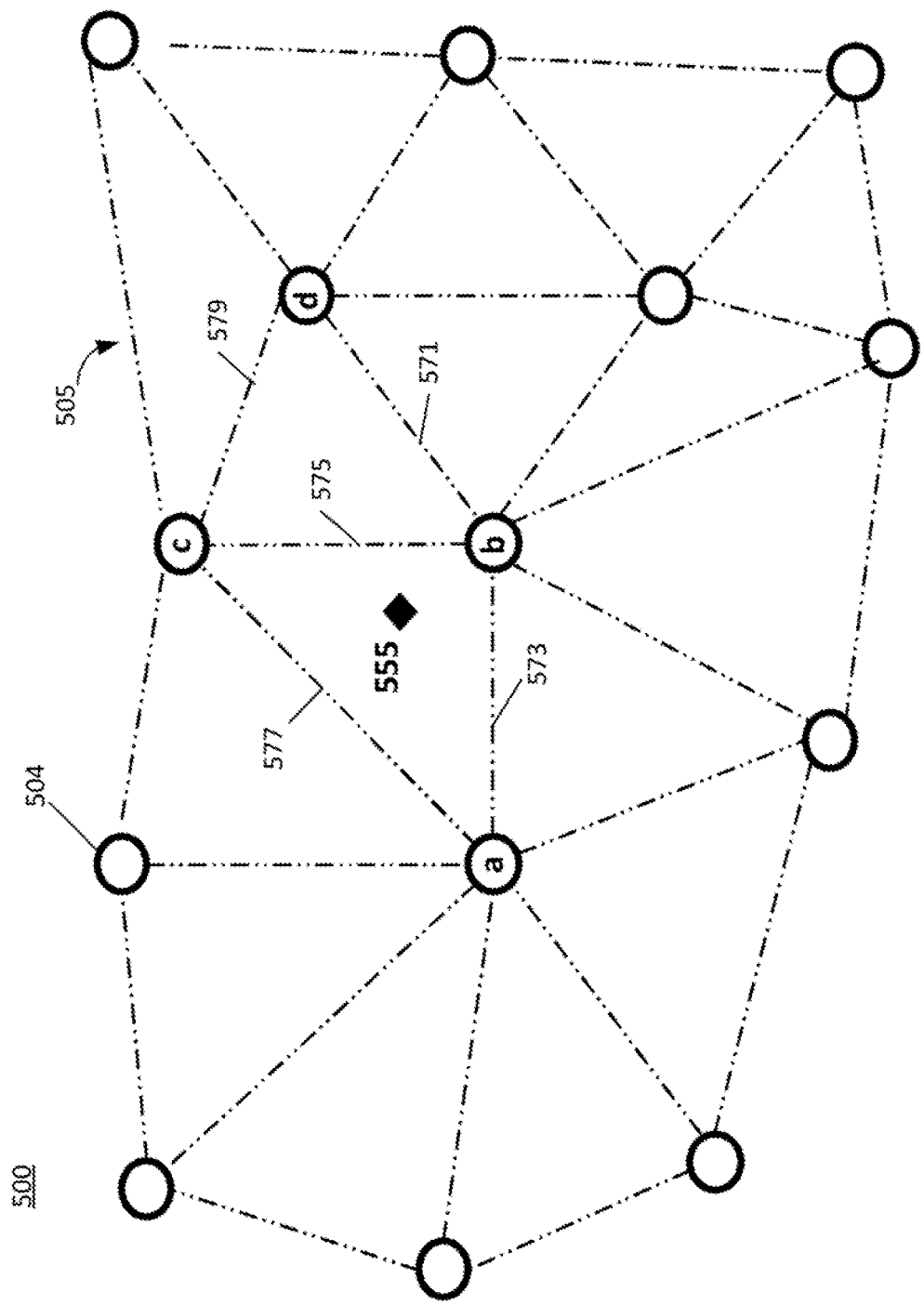
FIG. 5A is a diagram of an example of a network of RF nodes, e.g. RF-equipped lighting devices, useful for describing location estimation examples as disclosed herein.

A more detailed process example is described with reference to FIGS. 5A-6. As shown in FIG. 5A, a network 500 may include a number of nodes, such as 504. The nodes 504 may be configured similar to the RF-enabled lighting device 404 of FIG. 4, but may also be RF only nodes, such as an RF beacon 405, 405' of FIG. 4. An asset tag 555 may be located within a space, such as space 505 of the network 500.

For example with reference to the examples of FIGS. 4 and 5A, the asset tag 555 transmits the obtained node identifiers to a back end computing device as a 3-tuple (e.g., three-element set such as, for example, abc). The three node identifiers in the generated tuple may be ordered within the tuple from highest RSS to lowest RSS (including duplicates). Of course, the node identifiers may be any form of alphanumeric code or the like. The limits on the length of the identifier may be the amount of data that can be transmitted by the asset tag 555. The back end computing device may have access to a database, such as 407 of FIG. 4, containing information related to the space 505 (represented for example by a facility's floor plan, lighting map, grid map or the like). The database 407 may store the physical locations of all of the nodes, such as a, b, and c in FIG. 5A. Nodes a, b, c and 504 may be similar to nodes 404, 405, 405' in the network 402 of FIG. 4. The tag location estimating (LE) application 409 may be configured to estimate a location of the asset tag based on the three node identifiers in the generated tuple and the known physical locations of the three identified nodes to make a coarse estimate of the location of the asset tag, such as 555. For example as shown in FIG. 5A, the computing device, such as server 408 of FIG. 4, may use the known physical locations of the respective nodes retrieved from the database to determine that the location of the asset tag 555 of FIG. 5A is somewhere within triangle Δabc (having sides 573, 575 and 577).

For example, the asset tag 555 may receive signals from the respective nodes, for example, nodes a-d in the network, as well as the other nodes, such as 504, as the tag 555 is moved about the space 505. The asset tag 555 may transmit the identifiers associated with nodes a, b and c to a computing device. Each node in the network 500 may be considered a vertex of a hypothetical triangle, and each hypothetical side of the respective triangle is shown in FIG. 5A as dashed lines 571, 573, 575, 577 and 579. For example, the hypothetical sides 571, 573, 575, 577 and 579 are shown connecting one node, or triangle vertex, to another node, or another vertex of the triangle. Since the physical locations of nodes a, b and c within the space 505 are known to the computing device, a physical region approximated by triangle formed by the nodes (e.g., which may referred to in the database as a general location, such as the men's clothing section, aisles 1 and 2, vestibule area, café area, pharmacy, warehouse section one, region PQR (where P, Q and R are node identifiers/vertices), or the like) is selected as the asset tag's estimated physical location within the space based on the three obtained node identifiers. The computing device may use the whole triangle with the node identifiers at the vertices as a location estimate. Alternatively, in other examples, the tag location estimating application 409 of FIG. 4 executed by the computing device may configure the computing device to perform calculations and/or comparisons using information derived from the order of the node identifiers in the generated tuples and/or additional information related to measured signal attributes to generate more precise estimates of the tag location within the particular triangle. As a result, this process provides a coarse determination of the location of asset tag 555 as the physical locations of the respective nodes a, b and c may be tens of feet apart.

When configured to perform the fine estimate of the asset tag location, the tag location estimation application 409 of the computing device may make a finer estimate a location of the asset tag based on the order of the three node identifiers in the generated tuple and locations of the three identified nodes. Examples that utilize the order of the node identifiers in the generated tuple for more accurate location estimates are discussed in more detail in the following discussion.

In another example, an additional improvement to the system and process provides a coarse asset tag location estimation than the general asset tag location estimation system and process described above. The additionally improved coarse asset tag location estimation system may also utilize the node identifiers associated with the RSS measurements having the strongest received signal strength values. The system implementing the additionally improved system is configured to perform additional comparisons that enable the tag to provide more detailed information without increasing the amount of data transmitted by the asset tag.

As explained in the following discussion, an advantage of the further improved system and process is the capability to perform the coarse location estimate or determination of the transmitting asset tag within the space while transmitting a data set that is substantially the same as the data set transmitted for the coarse asset tag location estimation process. The further improved system and process enable the location of the asset tag within the space to be determined more accurately based on an ordering of the node identifiers within the transmitted data set, or generated tuple.

It may be appropriate at this time to discuss an operational example of the improved accuracy process performed by an asset tag in response to an RF signal broadcast by the RF-enabled light sources and/or RF beacons, such as 204, a, b, and d of FIG. 2, that are nodes within a network 202. The process flowchart of FIG. 6 illustrates an example of a process 600 that is performed by an asset tag, such as tag 219 of FIG. 2 or tag 555 of FIG. 5A. The process 600 will be described with reference to the network example of FIGS. 5A and 5B.

In FIG. 5A, the wireless nodes of network 500, such as a, b, c and 504 may be configured to transmit an RF signal that is intended to be received by any asset tag 555 within the space 505. An asset tag 555 within the space 505 may receive, at 610 of FIG. 6, a radio signal transmitted from a number of radio frequency-enabled nodes, such as a, b, c and d within the space 505. The asset tag 555 may measure the RSSs of all received node signals. For example, the asset tag 555 may measure an RSS of each respective received radio signal detectable at its current location. For example, the asset tag 555 may measure the RSS value of signals received from nodes a, b, c, and d. The measured RSS value may be a single RSS measurement (e.g., measured from one signal received from a respective node), an averaged RSS measurement (e.g. averaged over several measurements of signals received from the same node), a median RSS measurement (e.g. a median determined from several measurements of signals received from the same node), or the like.

The process 600 may include, for example, obtaining a respective transmitting node identifier from each of three of the respective received radio signals having strongest measured received signal strengths that may be accomplished in different manners. For example, the RF signal broadcasted by each of the respective nodes a, b, c, and d may include a node identifier that uniquely identifies the transmitting node (e.g. node a) from other transmitting nodes (e.g. nodes b, c and d) in the network 500. The unique node identifier may identify the particular node, such as in this example, one of nodes a-d that transmitted the respective received radio signal. The node identifier is extracted from each respective received radio signal by the logic circuitry of the tag (620). The broadcasted signal may, or may not, also include other information, such as a time stamp, network identifier (in the case of multiple networks in an area) or the like.

At 625, the asset tag 555 may be configured to associate the node identifier extracted from the respective received signal with the measured received signal strength of the same respective received signal. The asset tag 555 may be configured to maintain a table or register of the node identifiers that have the strongest measured RSSs. Based on the measured RSS values, the asset tag 555 may determine the node identifiers of the three closest nodes based on which of them is associated with the strongest signals. For example, the asset tag 555 may determine that the three nodes a, b and c in FIG. 5A have the three strongest measured RSS values that exceed a minimum RSS threshold level and that the measured RSS value of the signal transmitted by node d does not satisfy the minimum RSS threshold level. Therefore, the information related to node d may discarded, or may be saved for later analytics. Upon completing the association and the determination of the strongest measured RSS values, the asset tag 555 may select the three strongest measured RSSs (630).

Figure 5B:
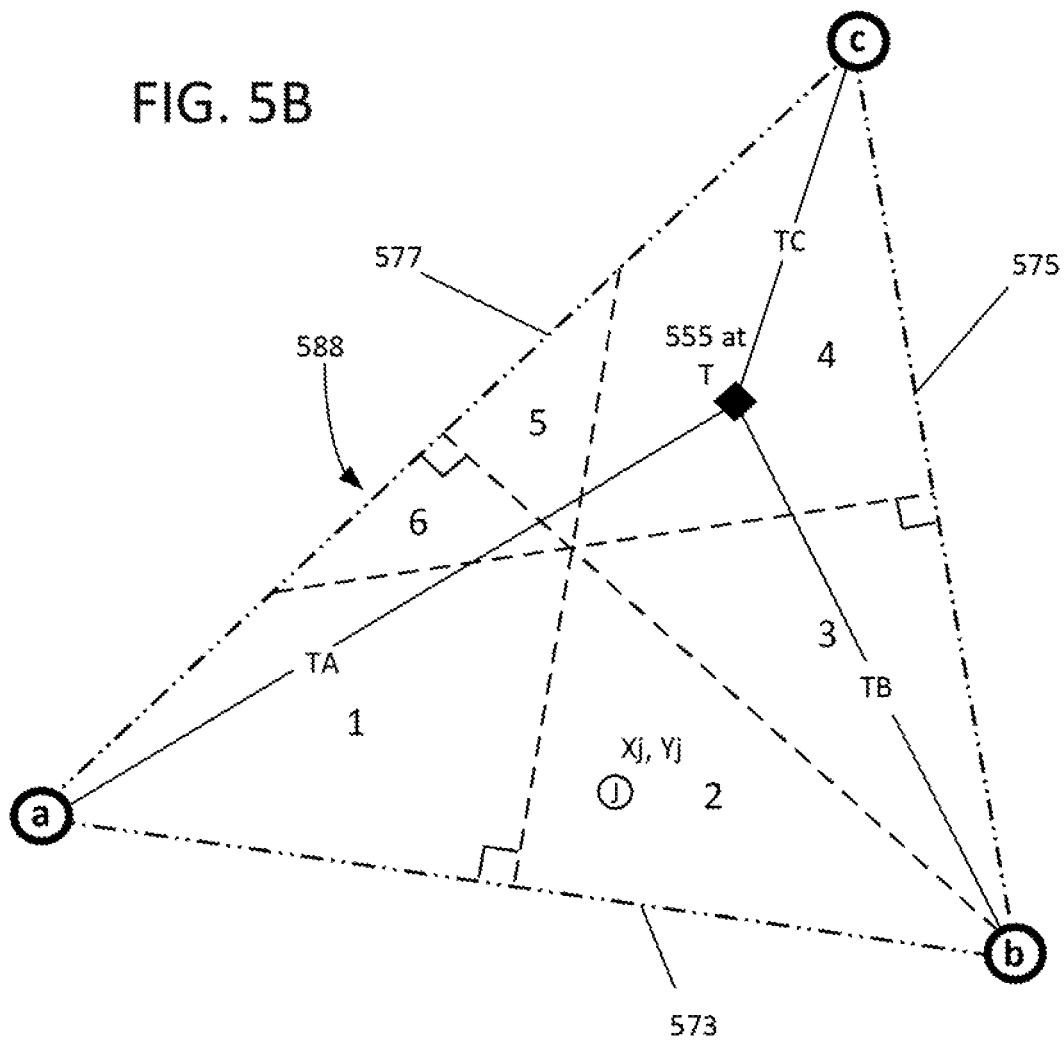
FIG. 5B is a more diagram showing a more detailed illustration of an area within the space serviced by the network of RF nodes shown in FIG. 5A.

The logic circuitry of the asset tag 555 may obtain a respective transmitting node identifier associated with each of the three selected measured RSSs (635). The logic circuitry of the asset tag 555 may be configured to compare, at 640, the measured RSSs of each of the selected three transmitted node identifiers to one another. FIG. 5B is useful for explaining the remaining steps of the process 600 of FIG. 6. FIG. 5B is a more detailed diagram showing a more detailed illustration of an area within the space serviced by the network of wireless RF nodes and/or RF-equipped lighting devices shown in FIG. 5A.

As result of the determination of nodes a, b and c having the three strongest measured RSS values, the asset tag 555 is likely located within the triangle form by nodes a, b, and c, and FIG. 5B provides a detailed view of the triangle Δabc with sides 573, 575 and 577.

To more easily describe the fine location estimate process, FIG. 5B shows triangle Δabc segmented into 6 regions. Any point with the triangle Δabc shown in FIG. 5B, may be represented by a coordinate pair such as "xy" including arbitrary point J and the location T of asset tag 555 inside the triangle Δabc. In FIG. 5B, the distances (assume a distance from one point x to another point y) may be represented by a coordinate pair "XY." In the example of FIG. 5B, a distance from the estimated tag location (represented by "T" in the inequalities below) to one of three vertices (i.e. nodes a, b, c) is represented by a letter pair, such as TA, where T represents the tag location and A is the location of vertex (i.e. node) a; TB, where T represents the tag location and B is the location of vertex (i.e. node) b; and TC, where T represents the tag location and C is the location of vertex (i.e. node) c. A relationship between the respective distances may be indicated by one of six (6) possible "distance" inequalities:

TA<TB<TC-distance of tag 555 to vertex a (i.e. node a) is less than distance of tag 555 to vertex b (i.e. node b), which is less than distance of tag 555 to vertex c (i.e. node c);

TA<TC<TB-distance of tag 555 to vertex a (i.e. node a) is less than distance of tag 555 to vertex c (i.e. node c), which is less than distance of tag 555 to vertex b (i.e. node b);

TB<TA<TC-distance of tag 555 to vertex b (i.e. node b) is less than distance of tag 555 to vertex a (i.e. node a), which is less than distance of tag 555 to vertex c (i.e. node c);

TB<TC<TA-distance of tag 555 to vertex b (i.e. node b) is less than distance of tag 555 to vertex c (i.e. node c), which is less than distance of tag 555 to vertex a (i.e. node a);

TC<TA<TB-distance of tag 555 to vertex c (i.e. node c) is less than distance of tag 555 to vertex a (i.e. node a), which is less than distance of tag 555 to vertex b (i.e. node b); and TC<TB<TA-distance of tag 555 to vertex c (i.e. node c) is less than distance of tag 555 to vertex b (i.e. node b), which is less than distance of tag 555 to vertex a (i.e. node a).

Each of the above triple inequalities corresponds to an estimated location in one of six (6) regions of the triangle Δabc of FIG. 5B. The three node identifiers in the generated tuple may be ordered within the tuple from highest RSS to lowest RSS (including duplicates).

By using the respective RSS values, the asset tag 555 does not need to measure actual distances from the vertices a, b, c in order to establish which inequalities hold at the tag's location. For example, in order for the location of asset tag 555 to be determined or estimated as being closer to node a than to node b (i.e. distance TA<TB), the computing device making the estimate need only determine that the measured RSS of the signal from node a is greater than the measured RSS of the signal from node b. That is, if RSS_a>RSS_b, is equivalent to TA<TB. As shown in the example of FIG. 5B, the following inequalities may be used to determine the respective region within FIG. 5B, the asset tag may be located:

RSS_a>RSS_b>RSS_c: Tag is located in subregion 1;
RSS_a>RSS_c>RSS_b: Tag is located in subregion 6;
RSS_b>RSS_a>RSS_c: Tag is located in subregion 2;
RSS_b>RSS_c>RSS_a: Tag is located in subregion 3;
RSS_c>RSS_b>RSS_a: Tag is located in subregion 4; and
RSS_c>RSS_a>RSS_b: Tag is located in subregion 5.

However, since the RSSI is not transmitted by the tag and only the node ID of the respective nodes. For example, a look up table may be stored in a memory or database such as the node data base 407 of FIG. 4 that has the following inequality relationships for Δabc:

TA<TB<TC: Tag is located in subregion 1;
TA<TC<TB: Tag is located in subregion 6;
TB<TA<TC: Tag is located in subregion 2;
TB<TC<TA: Tag is located in subregion 3;
TC<TB<TA: Tag is located in subregion 4; and
TC<TA<TB: Tag is located in subregion 5.

Alternatively, the server may be configured to derive the above inequality relationships may be based on the node IDs provided in the tuple. In yet another alternative, the server may be configured to directly determine a subregion of the polygon in which the tag is located based on the node IDs and the order of the node IDs in the generated tuple. The geometry of any polygon and the respective subregions within the polygon corresponding to node IDs provided in the tuple may be either stored in memory or derived from the respective node IDs.

An advantage of the disclosed asset tag, system and process is that three RSS comparisons enable a tag to straightforwardly generate a triple inequality that provides sufficient information to provide a unique and finer estimate of the location of the asset tag 555.

The asset tag 555 location is unknown. However, since it appears in every term of the triple inequalities listed above, it is not needed to uniquely specify the tag location as T in the inequality. The inequalities can thus be conveyed by 3-tuples of node IDs (e.g., "TB<TC<TA" can be conveyed as "bca"). Hence, the ordering of the three obtained node identifiers according to their ranking of lowest RSS value to strongest RSS value of the respective received signal strengths in the generated tuple may be equated to an order in one of the respective inequalities (e.g. the node with the lowest RSS<the node with an intermediary RSS<the node with highest RSS). Of course, the reverse order may also be true. For example, the order may be the node with the highest RSS>the node with an intermediary RSS>the node with lowest RSS.

Returning to the example process 600, based on the results of the comparison at 640 of the inequalities, the logic circuitry of the asset tag 555 may generate, at 645, a tuple containing the three obtained node identifiers. As part of the process performed at 645, the logic circuitry of the asset tag 555 may rank the ordinals of the tuple according the measured RSS of the respective three obtained transmitted node identifiers.

For example, a first ordinal in the ordered tuple may represent the obtained node identifier associated with the strongest (or highest) received signal strength value of the measured received signal strengths of the three obtained node identifiers. The second ordinal may represent the selected node identifier associated with an intermediary received signal strength value of the measured received signal strengths of the three obtained node identifiers. The third ordinal representing a lowest of the three obtained node identifiers. Alternatively, the reverse order may be used. For example, a first ordinal representing the obtained node identifier may be associated with the lowest received signal strength value. The second ordinal representing the selected node identifier associated with an intermediary received signal strength value of the measured received signal strengths. The third ordinal may represent a strongest, or highest, received signal strength of the three obtained node identifiers.

The generated tuple may be forwarded at 650 to a tag location estimating application configured to estimate a location of the asset tag. The tag location estimating application may be executed by a computing device remote from the asset tag 555. For example, the asset tag 555 may be configured to forward the tuple with the ordered node identifiers to a tag location estimating application, such as 409 of FIG. 4, in, for example, a computing device. The tag location estimating application upon execution by the computing device may configure the computing device to estimate, based on the order of the node identifiers in the generated tuple and the specific node locations associated with the node identifiers of the tuple, a location of the asset tag with respect to the specific node locations of the three node identifiers.

In FIG. 7, the location estimation process performed by the computing device implementing the tag location estimation (LE) application 409, such as gateway router 440 or location estimation server 408, may perform the illustrated example process. When the asset tag orders the transmitting node identifiers of the three nearest nodes to reflect their relative RSSs—e.g., weakest to strongest, say "bac"—before transmitting them to the computing device, the computing device may use the order of the transmitted node identifiers to more accurately estimate in which respective one of the six regions (e.g., 1-6 in FIG. 5B) within the triangle Δabc that the tag is located. By being able to further identify a particular region within the area covered by the triangle Δabc a more accurate location estimation may be made as compared to merely estimating the location of the asset tag 555 as being somewhere in the area of the entire triangle Δabc.

For example, a process may be performed by the asset tag in combination with a server or other computing device is described in more detail with reference to FIG. 5B. Using triangles for ease of illustration—that is, using the known locations of the three (3) closest nodes to the asset tag 555, the location of the asset tag 555 may be determined to be approximately within six (6) subregions of a triangular region (labeled 1-6) formed by nodes a, b and c.

In the example of FIG. 5B, the measured RSS values at each of the nodes may be −20 at node c, −40 at node b, and −50 at node a. The nodes a, b and c are at the vertices of an n-sided convex polygon, such as triangle Δabc surrounding the asset tag 555 in FIG. 5B. The asset tag 555 performs a comparison process as explained in detail above, and transmits the obtained node identifiers as an ordered n-tuple to the computing device. The computing device determines in which subregion of the n! sub-regions of the triangle the tag is located.

FIG. 5B shows the six regions 1-6 within an illustrative non-right triangle Δabc that are defined by the six possible sets of inequalities relating the distances from any given point (e.g., tag location) inside Δabc to each of the vertices (i.e. RF nodes). In FIG. 5B, the distance between any two points X and Y may be written "XY" and is shown as a solid line segment. In the example of FIG. 5B, the location of asset tag 555 may be at T, which is closer to node c than to node b (i.e., distance TC<distance TB), closer to node c than to node a (i.e. distance TC<distance TA), and closer to node b than to node a (i.e. distance TB<distance TA). These three inequalities hold for all points in Region 4; that is, they hold no matter where in Region 4 the tag 555 is located. Each region (1-6) corresponds to a unique set of three inequalities; therefore, determining which inequalities hold for a point, such as T, within Δabc suffices to estimate which region of the triangular area the asset tag was located at the time the signals from the node were received. Hence, using only the inequalities a computing device may estimate a location of the asset tag 555.

The three distance inequalities for each region (e.g., TC<TB, TC<TA, and TB<TA for Region 4) can be written as a single triple inequality (e.g., TC<TB<TA). The amount of data may be further reduced by eliminating the T and just sending, for example, only the node identifiers CBA in that specific order as the tuple. Using the node identifiers, a computing device may obtain data indicating the specific physical node locations of the obtained nodes within a space. The computing device may determine that the asset tag is located within a triangular region in which the vertices (i.e. a, b and c) of the triangular region 588 based on the data indicating the specific node locations of the obtained nodes. Based on the order of the three selected transmitted node identifiers in the tuple, the computing device may further attribute a weighting between a respective vertex of the vertices and the asset tag. For example, the first ordinal in the tuple (i.e. C) may be given a first weight, the second ordinal (or intermediary value) in the tuple (i.e. B) may be given a second weight, and the third ordinal in the tuple (i.e. A) may be given a third weight. The computing device using the attributed weights based the order of the three obtained node identifiers in the tuple may estimate the estimated location of the asset tag with respect to the vertices of the triangular region. For example, using the particular weightings, the computing device may determine a default estimated distance away from the node represented by the first ordinal (i.e. C) and then alter that default estimated distance based on the weightings of the second (i.e. B) and third (i.e. A) ordinals to arrive at a final estimated location of the asset tag.

FIG. 7 illustrates an example of a process performed by a computing device to estimate a location of an asset tag, such as the computing device and asset tag shown in the example of FIG. 4.

A back end device, such as location estimation server 408 of FIG. 4, and an asset tag, such as 419, may be coupled to a data communication network 401. The data communication network 401 may include a number of wireless RF-enabled nodes, such as 404 and 405, 405'. In some instances, a portion of the number of wireless RF-enabled nodes, such as 404 and 404' may also be configured to communicate via visible light communication signals. The location estimation server 408 may receive a tuple from the asset tag 419. The tuple may contain at least three node identifiers. The at least three node identifiers are ordered in the tuple according to a strongest or highest ranked signal attribute to a weakest or lowest ranked signal attribute of the received signals of the at least three selected transmitted node identifiers. The signal attributes may include received signal strength, angle of arrival or departure, time of flight or the like. The server 408 may be configured upon the execution of programming code to perform functions and operations of process 700 based on information received via the data communication network 401. At 710, the server 408 may receive a tuple transmitted by an asset tag with a space. The tuple may contain at least three transmitting node identifiers in a specific order. The specific order identifying the respective transmitting node that transmitted a signal having a particular signal attribute (e.g., strongest, intermediate, weakest). Upon receipt of the tuple having the ordered transmitting node identifiers, the server 408 may be configured to access a memory where the specific node locations are stored, and retrieve specific node locations of each of the at least three selected transmitted node identifiers (715).

The server may be further configured to determine, based on the generated tuple and the specific node locations associated with the obtained transmitting node identifiers, that the asset tag is located within a polygonal region in which the vertices of the polygonal region are the specific node locations of the at least three obtained node identifiers (720). In a specific example, using three node identifiers, the server may be configured to determine a location of the asset tag within a triangular region (i.e. Δabc in FIG. 5B) formed by using the specific node locations of the three obtained node identifiers as vertices of the triangular region. This determination of the location of the asset tag within the polygonal region in the space may be referred to as a coarse asset tag location determination.

The server may obtain, at 725, a list of inequalities corresponding to the vertices of the determined polygonal region. The server may obtain a data set containing the inequalities, or access a look up table, stored in memory. The obtained data set or look up table may contain a list of inequalities for each polygonal region that may be formed from nodes within a space. The order of the transmitted node identifiers may be evaluated by the server with respect to a list of inequalities associated with the determined polygonal region. Continuing with the specific example of three obtained node identifiers as in FIG. 5B, the server may identify an inequality having an order that matches the order of node IDs in the tuple. The server, for example, may as part of the evaluation compare the order of the node IDs in the tuple to an order of elements in the inequalities of the obtained data set or look up table. Based on the results of the comparison, the server may identify an inequality corresponding to an order of the node IDs in the received tuple (730). As part of the list of inequalities, each inequality may include an indication of a subregion within the determined polygonal region. Using the identified inequality and the subregion indication, the server estimates the location of the asset tag as being located in indicated subregion. For example, in FIG. 5B, the server may determine that the asset tag 555 is located in subregion 5 of Δabc because the node IDs in the tuple output by the asset tag 555 correspond to an inequality that indicates subregion 5 (735).

The server may forward (740) the estimated location to an output device for presentation to a user. Examples of an output device may be a computer monitor, a video wall, a mobile device display screen or the like.

Figure 8:
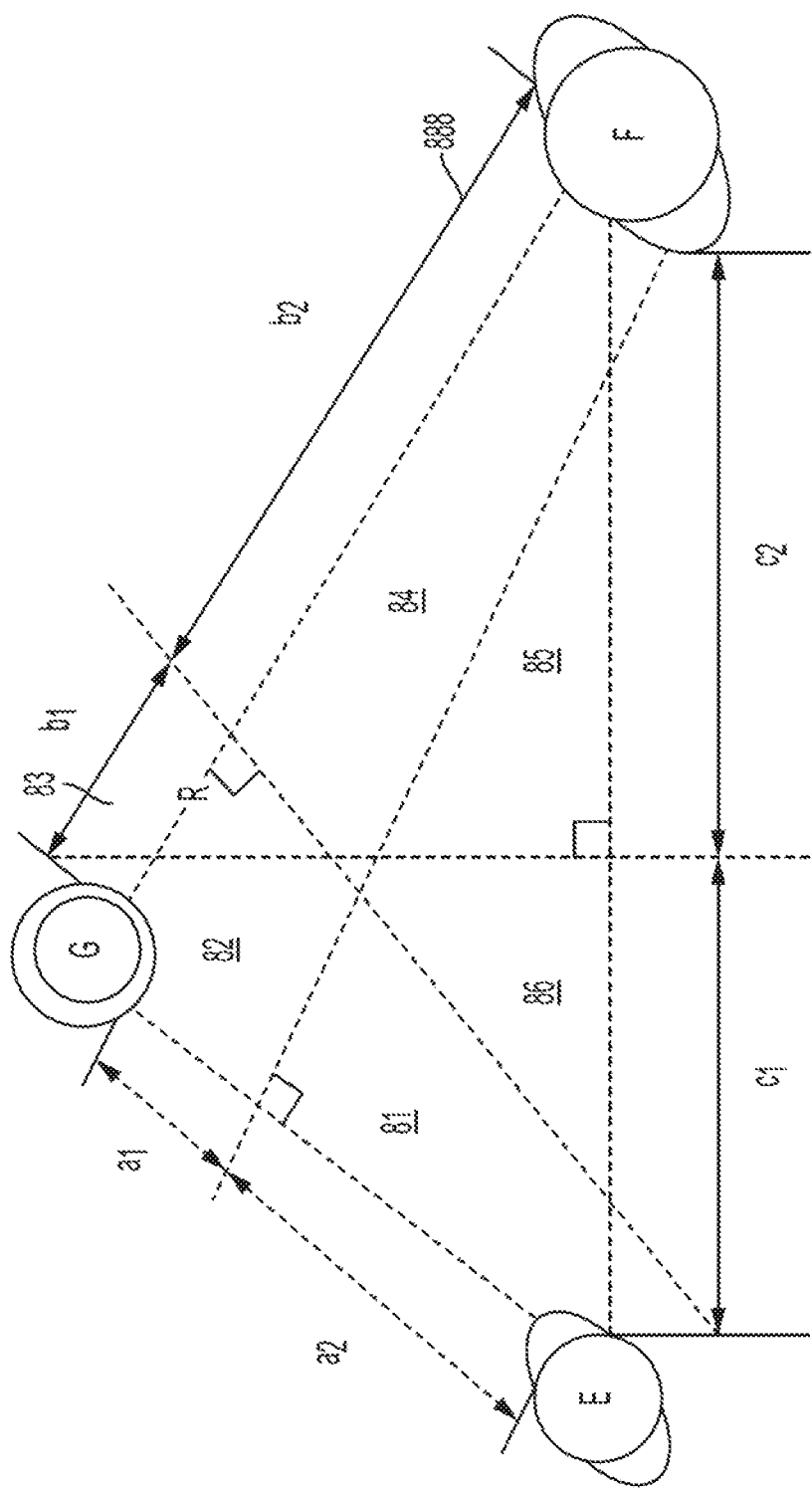
FIG. 8 illustrates a polygonal region useful for explaining an additional function executable by asset tag information processing circuitry for providing additional information to further improve asset tag location estimation accuracy.

The foregoing discussion of process 700 described a process for a fine estimate of the location. As mentioned earlier, an additional process for further improvement of the accuracy of the asset tag location estimation is also contemplated. This additional process may provide a finer location estimation than that described with respect to FIG. 7. The additional process may alter the area of the respective subregions 1-6 based on differences between the respective RSS measurements determined by the asset tag. For example, a difference between a first RSS measurement value and a second RSS value may be determined, a difference between the first RSS measurement value and a third RSS value may be determined, and a difference between first RSS measurement value and the third RSS value may be determined. These differences may be referred to as delta values. FIG. 8 illustrates a modified example of FIG. 7 in which the position of the perpendicular lines that segment the triangular area 888 into regions (81-86) may be altered based on ratios generated from delta values.

By using the delta value ratios, the six regions (labeled 81-86) within the triangle area 800 may now vary in area, by decreasing or increasing the area, to more precisely estimate a region in which the asset tag is likely located. For example, the delta value between the RSSIs of node 1 and node 2 may be 5% while the delta value between the RSSIs of Node 1 and node 3 may be 10%. In the example, the region with the smaller percentage difference (e.g. 5%) may have a smaller area than the region area having the larger percentage difference (e.g. 10%).

For example, when the generated tuple is forwarded the asset tag may also forward the delta values. The tag location estimation application, such as 409 in FIG. 4, may be further configured to utilize the delta values as outlined above when estimating the location of the asset tag.

Referring back to the general discussion of a polygon shape, in the case of a nodal network having a given density of nodes in the network, using polygons with more than 3 sides may yield sub-regions much smaller than those within triangles filling/covering the same network. In the case of having smaller regions, the location estimation accuracy is improved with only marginally greater data transmission (e.g., tuples with greater than three transmitting node identifiers).

The system described here is intended to be illustrative, not limiting. In various embodiments, asset tags may measure angle-of-arrival and other properties of signals as well as RSS and either transmit this information to a computing device or use it in on-board computations. Alternatively or additionally to the performance of calculations by a computing device, computations may be performed at any point in the system, or in a distributed manner. Also, nodes may measure RSS of signals transmitted by asset tags. Any such data can be combined variously with the RSS-derived information described above. Also, previous location estimates can be used to inform and improve new estimates, for example, Bayesian methods may be used and/or machine learning principles may be used to improve accuracy over time. In sum, a wide variety of location-estimation computations can be made from tag- and/or node-gathered data, based on various geometric and statistical principles; all such computations, not only the examples given here, are contemplated.

The tag location estimation based on node proximity has been represented as a two-dimensional problem; however, similar principles hold over a wide range of three-dimensional settings.

The foregoing discussion referred to details of tag location estimation using signals transmitted by respective node beacons that are received by an asset tag that in response generates a tuple as described above. The provision of the tag location estimation according the described processes may be provided via a number of different data communication systems. The examples above also include a technique of communicating the message with the tuple through nodes of a wireless network formed by the devices that also serve as the beacons, to a tag location estimating application.

Other communication systems may be used. One example of such an alternate communication system is disclosed in the contemporaneously filed patent application entitled Improved Asset Tag Tracking System and Network Architecture. The entire contents of which are incorporated herein by reference. Such a data communication system may include, for example, a plurality of wireless communication nodes distributed about a space, a number of edge gateways and a fog gateway. Each of the plurality of wireless communication nodes may include a processor, a memory, and a node radio frequency transceiver configured to receive and transmit signals radio frequency signals. Each of the edge gateways may include a processor, a radio-frequency transceiver, and a memory. The intermediary radio-frequency transceiver may be configured to communicate with the node radio frequency transceivers of the wireless communication nodes. The fog gateway may be communicatively coupled to each of the edge gateways. The fog gateway includes a fog gateway radio frequency transceiver, a processor and a memory. The fog gateway radio frequency transceiver is configured to communicate with the edge gateway transceiver.

Each of the plurality of wireless communication nodes may be configured to receive a basic message transmitted by an asset tracking tag located in the space, and measure a signal attribute of the received basic message. The measured signal attribute may be associated in the node memory the measured signal attribute with a node identifier of the wireless communication node that made the signal attribute measurement. The basic message includes an identifier of the asset tracking tag and a basic message sequence number. Each communication node may be configured to transmit a node asset message to an edge gateway of the plurality of edge gateways. The node asset message includes the asset tracking tag identifier, the basic message sequence number, a node identifier of the respective wireless communication node transmitting the respective node asset message, and the measured signal attribute of the basic message measured by the respective wireless communication node transmitting the respective node asset message. The edge gateway of the wireless communication nodes may be configured to receive the respective transmitted node asset message transmitted by each of the three or more wireless communication nodes. The edge gateway may determine respective node identifiers of a number of respective nodes nearest to the asset tracking tag based on the measured signal attribute of the basic message included in each respective node asset message.

An aggregated message may be forwarded to the fog gateway by the at least one edge gateway. The aggregated message may enable an estimate of the location of the asset tracking tag using the list of ranked node identifiers in the aggregated message. The aggregated message may include the asset tracking tag identifier, the basic message sequence number, and a list of the node identifiers associated with a respective one of the highest measured signal attribute values.

The fog gateway may be configured to receive a respective aggregated message from each of the edge gateways; and obtain an estimate of the location of the asset tracking tag within the space based on the list of the node identifiers. One approach to the estimation, suggested in the contemporaneously filed application, may involve the fog gateway selecting the three of the three node identifiers identified as being associated with the three highest measured signal attribute values, from among node identifiers in the lists of node identifiers in the aggregated messages forwarded by the edge gateways. The actual estimation may then use a computation like one of those implemented by the tag location estimating application, e.g. similar to the technique outlined above relative to FIG. 8 of the present application.

Of course, data communication system configurations other than those described in the contemporaneously filed application may be used.

As shown by the above discussion, functions relating to the asset tag location estimates, and the like may be implemented on computers connected for data communication, e.g. with the RF enable nodes. Although special purpose devices may be used, such devices also may be implemented using one or more hardware platforms intended to represent a general class of data processing device commonly used to run "server" programming, for example, to perform functions attributed to the location estimation server discussed above, albeit with an appropriate network connection for data communication.

As known in the data processing and communications arts, a general-purpose computer typically includes a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for a node location lookup table and/or the updates thereof. The software code is executable by the general-purpose computer that functions as the location estimation server and/or that functions as a gateway. In operation, the programming code is stored within the general-purpose computer platform. At other times, however, the software may be stored at other locations and/or transported for loading into the appropriate general-purpose computer system. Execution of such code by a processor of the computer platform enables the platform to implement the methodology to measure RSS and determine an order of the node identifiers within the tuple, in essentially the manner performed in the implementations discussed and illustrated herein.

Figure 10:
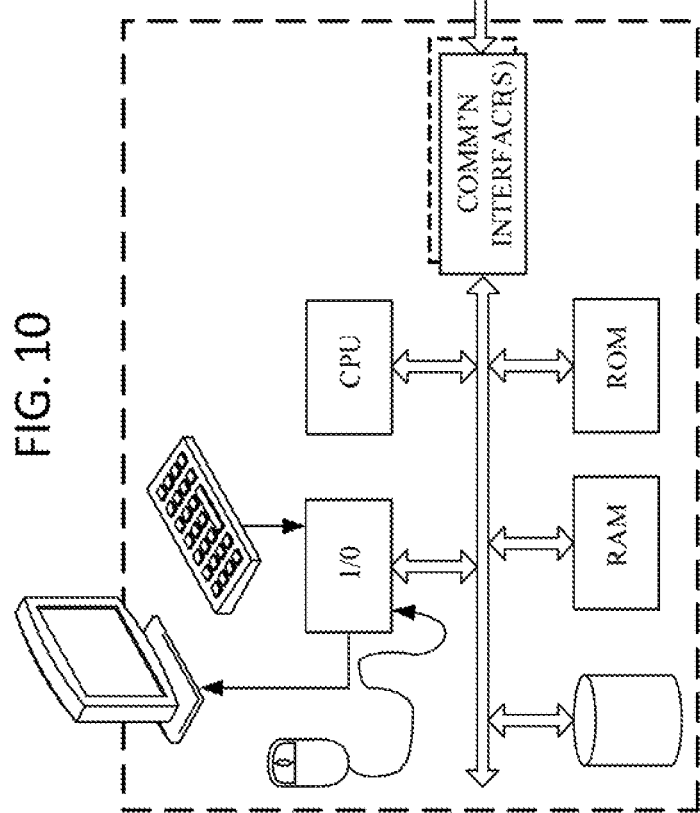
FIG. 10 is a simplified functional block diagram of a personal computer or other work station or terminal device usable for executing location estimation applications and/or receiving location estimation information related to an asset tag.
Figure 9:
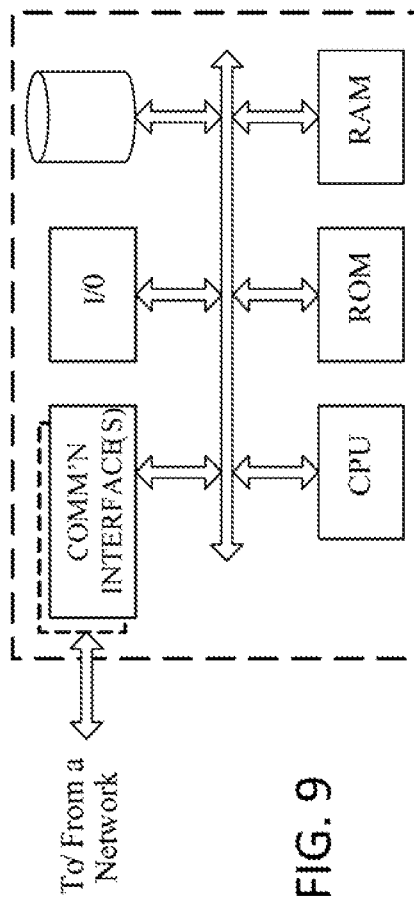
FIG. 9 is a simplified functional block diagram of a computer that may be configured as a host or server, for example, to function as either of the servers in the system of FIG. 4.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

Hardware of a server computer, for example (FIG. 9), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Figure 11:
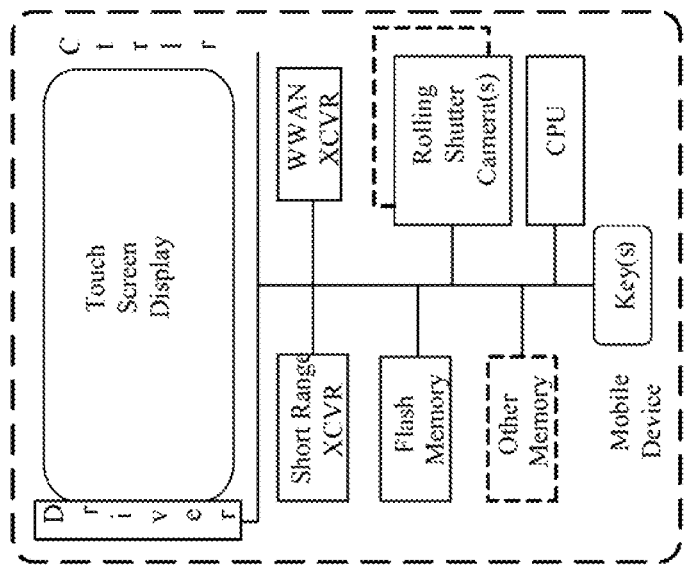
FIG. 11 is a simplified functional block diagram of a mobile device usable for executing location estimation applications and/or receiving location estimation information related to an asset tag.

FIG. 10 depicts a computer with user interface elements, as may be used to implement a portable device or other type of work station or terminal device, although the computer of FIG. 10 may also act as a server if appropriately programmed. Hardware of a computer type user terminal device, such as a PC or tablet computer, may include a data communication interface, CPU, main memory and one or more mass storage devices for storing user data and the various executable programs (see FIG. 10). A mobile device (FIG. 11) type user terminal may include similar elements, but will typically use smaller components that also require less power, to facilitate implementation in a portable form factor. It is believed that those skilled in the art are familiar with the structure, programming and general operation of such computer equipment and as a result the drawings should be self-explanatory. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 11), the mobile device may be configured to receive the asset tag location estimate for presentation of the estimated location to a user via a touch screen display of the mobile device. The hardware elements, operating systems and programming languages of such user terminal devices also are conventional in nature, and it is presumed that those skilled in the art are adequately familiar therewith.

Hence, aspects of the methods receiving signals, processing the received signals and generating data for determining a location of an asset tracking tag in a space outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming and/or the relevant data. All or portions of the software and/or the relevant data may at times be communicated through the Internet, telecommunication networks, or various other data networks. Such communications, for example, may enable loading of the programming and the database from one computer or processor into another, for example, from a management server or host computer of an enterprise location, or more generally, the location determination or estimation service provider into the computer platform and on-line to perform the relevant server functions in an actual working environment. Thus, another type of media that may bear the software elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Thus the following claims are hereby incorporated into the Detailed Description, with each claim standing on its own as a separately claimed subject matter.

What is claimed is:

1. A method, comprising:
receiving, by an asset tag, a radio signal transmitted from one or more radio frequency-enabled nodes within a space, each respective received radio signal including a unique node identifier of the respective radio frequency-enabled node that transmitted the respective received radio signal, wherein each unique node identifier is associated with a specific node location in the space of the respective radio frequency-enabled node;
measuring a received signal strength of each respective received radio signal;
obtaining a respective transmitting node identifier from each of at least three of the respective received radio signals whose measured received signal strengths are strongest;
generating a tuple containing an ordered list of at least three transmitting obtained node identifiers sorted by the respective measured received signal strengths;
forwarding the tuple to a tag location estimating application; and
estimating, by the tag location estimating application, based on the generated tuple and the specific node locations associated with the obtained transmitting node identifiers, a location of the asset tag with respect to the specific node locations of the nodes associated with the obtained node identifiers, wherein the estimating includes:
retrieving, using the at least three node identifiers provided in the generated tuple, data indicating the specific node locations of the three or more transmitting nodes within the space from a memory, and
determining where within a polygon region of the space the asset tag is located, wherein the determining where within the polygon region of the space the asset tag is located comprises:
calculating at least two delta value ratios from the respective measured received signal strengths of the at least three node identifiers, and
adjusting where within the polygon region of the space the asset tag is located based on the at least two delta value ratios.

2. The method of claim 1, further comprising:
generating a data packet including information related to the estimated location of the asset tag within the space; and
forwarding the data packet to a computing device for output of an indicator of the estimated location of the asset tag on a display device coupled to the computing device.

3. The method of claim 1, wherein:
the at least three obtained transmitting node identifiers are ordered within the generated tuple according to a ranking of a strongest received signal strength value to a lowest received signal strength value of the respective received signal strengths of the at least three selected transmitted node identifiers.

4. The method of claim 1, wherein the generated tuple comprises:
a first ordinal representing the obtained transmitting node identifier associated with the strongest received signal strength value of the measured received signal strengths of the at least three obtained transmitting node identifiers,
a second ordinal representing the selected node identifier associated with an intermediary received signal strength value of the measured received signal strengths of the at least three obtained node identifiers, and
a third ordinal representing the obtained transmitting node identifier associated with a lowest received signal strength value of the measured received signal strengths of the at least three obtained transmitting node identifiers.

5. The method of claim 1, wherein generated tuple comprises:
a first ordinal representing the obtained transmitting node identifier associated with the lowest received signal strength value measured received signal strength of the at least three obtained transmitting node identifiers,
a second ordinal representing the obtained transmitting node identifier associated with an intermediary received signal strength value measured received signal strength of the at least three obtained transmitting node identifiers, and
a third ordinal representing a strongest of the at least three obtained transmitting node identifiers.

6. The method of claim 1, wherein vertices of the polygon region are the specific node locations of the at least three obtained transmitting node identifiers.

7. A system, comprising:
a plurality of radio frequency-enabled nodes located within a space, each of the plurality of nodes being configured to emit a node-unique radio frequency signal including a unique node identifier of the radio frequency-enabled node, wherein each unique node identifier is associated with a specific node location in the space;
an asset tag within the space, the asset tag comprising:
logic circuitry,
a memory coupled to the logic circuitry,
radio frequency receiver circuitry, and
radio frequency transmitter circuitry; and
a server coupled via a radio frequency communication data link provided by one of the plurality of nodes to the asset tag,
wherein the logic circuitry configures the asset tag to perform functions, including functions to:
receive, via the radio frequency receiver circuitry, a node-unique radio signal transmitted from at least three of the radio frequency-enabled nodes of the plurality of nodes within a space;
measure a received signal strength of each respective received node-unique signal;
obtain a respective transmitting node identifier whose measured received signal strength is from the measured received signal strengths that are strongest;
generate a tuple containing at least three of the obtained transmitting node identifiers; and
forward the generated tuple to the server, wherein the server is configured to:
receive the generated tuple forwarded from the asset tag; and
estimate, based on the generated tuple and the specific node locations associated with the obtained transmitting node identifiers, a location of the asset tag with respect to a respective specific node location of each of the obtained transmitting node identifiers in the generated tuple, wherein the estimating includes:
retrieving, using the at least three node identifiers provided in the generated tuple, data indicating the specific node locations of the three or more transmitting nodes within the space from a memory, and determining where within a polygon region of the space the asset tag is located, wherein the determining where within the polygon region of the space the asset tag is located comprises:

calculating at least two delta value ratios from the respective measured received signal strengths of the at least three node identifiers, and adjusting where within the polygon region of the space the asset tag is located based on the at least two delta value ratios.

8. The system of claim 7, wherein when obtaining a respective transmitting node identifier, the logic circuit is configured to perform the function to:

extract a node identifier from each received node-unique signal; and associate the node identifier extracted from each respective received node-unique signal with the measured received signal strength of the same respective received node-unique signal.

9. The system of claim 7, wherein the server is further configured to perform functions, including functions to:

output of an indicator of the estimated location of the asset tag to a user device.

10. The system of claim 7, wherein:

the obtained node identifiers are ordered in the generated tuple according to a ranking of a strongest received signal strength value to a lowest received signal strength value of the respective received signal strengths of the obtained transmitting node identifiers.

11. The system of claim 7, wherein generated tuple comprises:

a first ordinal representing the obtained node identifier associated with the strongest received signal strength value measured received signal strength of the at least three obtained node identifiers, a second ordinal representing the selected node identifier associated with an intermediary received signal strength value measured received signal strength of the at least three obtained node identifiers, and a third ordinal representing a lowest of the at least three obtained node identifiers.

12. The system of claim 7, wherein each obtained node identifier is further associated with a specific node location of the selected node in the space.

13. The system of claim 7, wherein vertices of the polygon region are the specific node locations of the at least three obtained transmitting node identifiers.

14. A method, comprising:

receiving, from an asset tag coupled to a data communication network, a tuple containing at least three wireless node identifiers;

retrieving data indicating a node location for the wireless nodes identified by the at least three wireless node identifiers included in the received tuple;

estimating a location of the asset tag with respect to the node locations of the at least three node identifiers based on the order of the at least three wireless node identifiers in the received tuple and the retrieved data indicating the node location for each wireless node associated with the at least three node identifiers, wherein the estimating includes:

retrieving, using the at least three node identifiers provided in the generated tuple, data indicating the specific node locations of the three or more transmitting nodes within the space from a memory, and determining where within a polygon region of the space the asset tag is located, wherein the determining where within the polygon region of the space the asset tag is located comprises:

calculating at least two delta value ratios from the respective measured received signal strengths of the at least three node identifiers, and adjusting where within the polygon region of the space the asset tag is located based on the at least two delta value ratios; and forwarding the estimated asset tag location to an output device for presentation to a user.

15. The method of claim 14, wherein each node identifier of the at least three node identifiers is further associated with a respective physical location within the space.

16. The method of claim 14, wherein the signal attribute is a received signal strength.

17. The method of claim 14, wherein the at least three wireless node identifiers are ordered in the tuple according to a strongest ranked signal attribute to a lowest ranked signal attribute of signals received from wireless nodes associated with each of the at least three wireless node identifiers.

18. The method of claim 14, wherein vertices of the polygon region are the specific node locations of the at least three obtained transmitting node identifiers.

* * * * *